United States Patent
Doyama et al.

(10) Patent No.: US 6,232,730 B1
(45) Date of Patent: May 15, 2001

(54) BRUSHLESS MOTOR DRIVING CIRCUIT AND A METHOD OF CONTROLLING THE BRUSHLESS MOTOR DRIVING CIRCUIT

(75) Inventors: Yoshiaki Doyama, Hirakata; Hideki Nakata, Neyagawa; Kaneharu Yoshioka, Katano; Makoto Yoshida, Kusatsu, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/323,967

(22) Filed: Jun. 2, 1999

(30) Foreign Application Priority Data

Jun. 5, 1998 (JP) .................................................. 10-157558

(51) Int. Cl.$^7$ ....................................................... H02P 5/00
(52) U.S. Cl. .......................... 318/254; 318/138; 318/439; 318/801; 318/805; 318/799
(58) Field of Search ..................................... 318/254, 138, 318/439, 801, 805, 799

(56) References Cited

U.S. PATENT DOCUMENTS

| | | | |
|---|---|---|---|
| 4,712,050 | * 12/1987 | Nagasawa et al. | 318/254 |
| 5,640,073 | * 6/1997 | Ikeda et al. | 318/439 |
| 5,739,651 | * 4/1998 | Miyazawa et al. | 318/439 |
| 5,821,708 | * 10/1998 | Williams et al. | 318/254 |
| 5,859,512 | * 1/1999 | Buthker | 318/254 |

FOREIGN PATENT DOCUMENTS 8-238247   9/1996   (JP) .

OTHER PUBLICATIONS

Tsunehiro Endo et al. "Brushless Motor Without a Shaft-Mounted Position Sensor" (translated )*IEEE of Japan*, vol. 105, No. ½, p. 80–87, 1985.
Partial translation of JP Application No. 8–238247.

* cited by examiner

Primary Examiner—Robert E. Nappi
Assistant Examiner—Rita Leykin
(74) Attorney, Agent, or Firm—Smith, Gambrell & Russell, LLP

(57) ABSTRACT

In a brushless motor driving circuit of the invention, in the starting operation, an applying voltage is low and also the induced voltage is low, so that output values from sample and hold circuits 6 and 7 are substantially equal to each other. Thus, an output from a comparing circuit 10 is substantially equal to an output of a V/f converting circuit 11. As a result, the starting method which is identical with a conventional method is used. By contrast, when the number of rotation of a brushless motor 1 is increased, and the induced voltage is started to be observed, the condition is spontaneously shifted to that in which the driving voltage is automatically controlled at each time to an appropriate value for the number of rotation and the load of the motor. Accordingly, the switching operation from the starting control to the normal control is not required.

10 Claims, 15 Drawing Sheets

(a)
waveform of terminal voltage
110

(b)
input voltage of selecting circuit
113

(a)

(b)

(c)

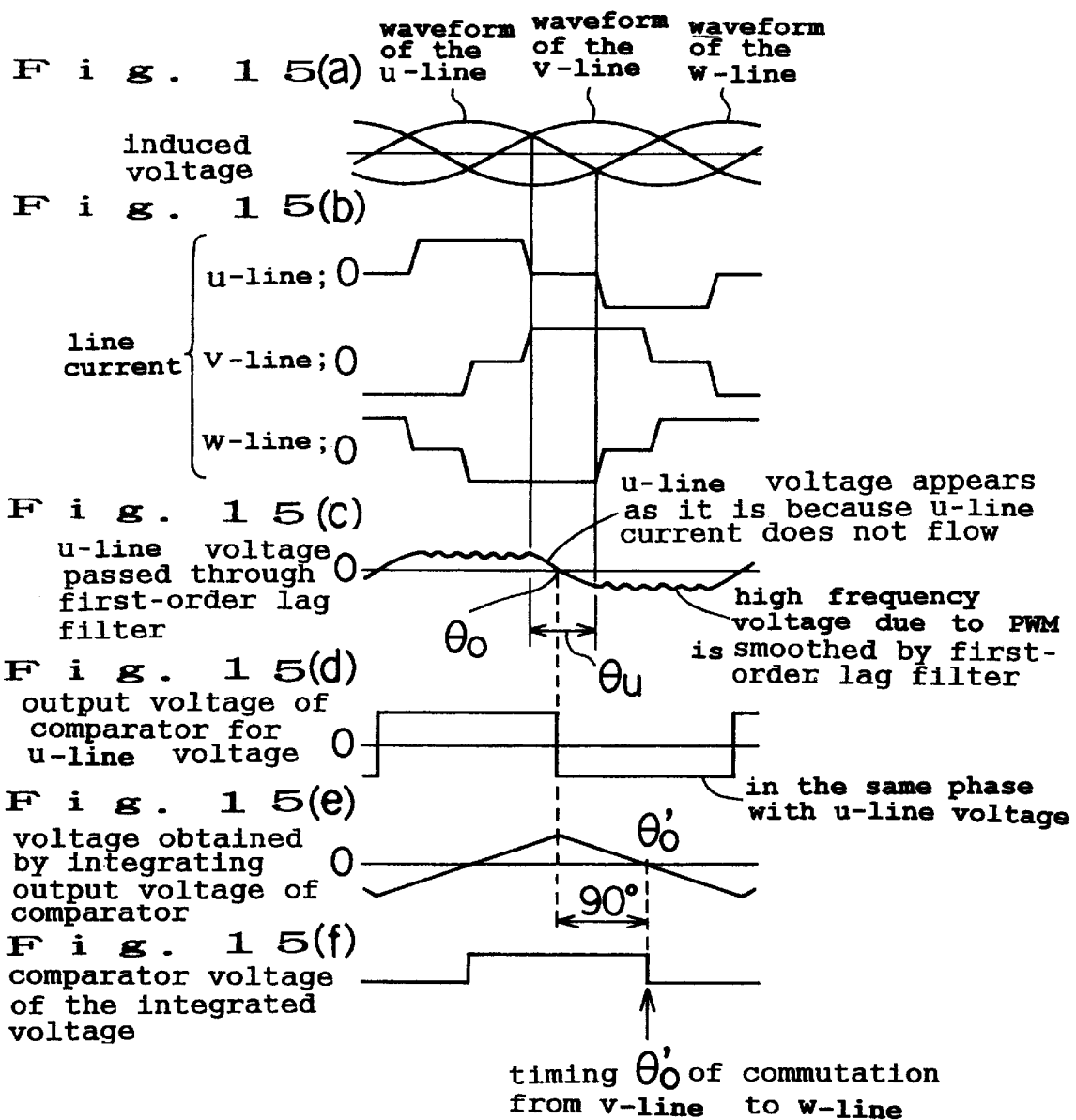

BRUSHLESS MOTOR DRIVING CIRCUIT AND A METHOD OF CONTROLLING THE BRUSHLESS MOTOR DRIVING CIRCUIT

BACKGROUND OF THE INVENTION

1. Field of the Invention

The present invention relates to a driving circuit for a so-called brushless motor in which, for example, a permanent magnet is used as a rotor, and a rotational alternating magnetic field is generated as a field, and also to a method of controlling such a circuit, and more particularly to a driving circuit for driving a brushless motor without requiring a rotational position sensor for a rotor.

2. Description of the Related Art

As a method of regulating a cooling ability of a refrigerating air conditioning apparatus by driving a compressor and the like at a variable speed, a method is generally employed in which an electric motor serving as a driving source for the compressor is driven at a variable speed. Particularly, it is known that a brushless motor in which an armature winding is wound on the stator, and a permanent magnet is mounted on the rotor operates efficiently. In a brushless motor, it is necessary to switch over magnetic poles for the field in accordance with the rotational position of the rotor, and therefore a sensor for detecting the rotational position is attached to the motor. In the case where a brushless motor is used in a hermetic compressor or the like, however, it is difficult to attach a rotational position sensor to the motor because the electric motor itself is closed and the interior of the electric motor has a high temperature. As a result, a driving circuit for the brushless motor has a somewhat complicated configuration.

As a driving circuit for a brushless motor in which a rotational position sensor is not used, conventionally, a circuit described in pages 241 to 243 of "Introduction to Power Electronics (revised second edition), 1991" edited by Yamamura and written by Ohno is used.

FIG. 14 is a diagram showing a conventional brushless motor driving circuit described in the above-specified literature. Hereinafter, with reference to the figure, the configuration of the conventional brushless motor driving circuit will be described.

In FIG. 14, 18 denotes a brushless motor driven in a 120-degree current-supplying system, 19 denotes a three-phase bridge circuit connected to three-phase terminals of the brushless motor 18, 20 denotes a voltage phase detecting circuit which detects an induced voltage of the brushless motor 18, 21 denotes a control circuit which performs the generation of a timing pulse for driving the brushless motor 18 in the 120-degree current-supplying system with respect to a preset number of rotation, and other operations, and 22 denotes a voltage doubler rectifying circuit which is connected between an AC power source 23 and the three-phase bridge circuit 19.

Referring to the figure, a variable rate limiting circuit 1211 is used for slowly accelerating the rotational speed from a very slow speed condition at the starting. A judging circuit 1212 judges, when the speed has been increased to some extent, whether it is necessary to change the control method to a method by a magnetic pole position detecting circuit, or not. A V/f converting circuit 1213 generates a pulse width modulation signal which becomes a three-phase AC voltage that is substantially proportional to the rotation speed. Selector switches 1214a to 1214c select outputs of the control circuit 21 and the V/f converting circuit 1213 in accordance with an output of the judging circuit 1212.

Next, with reference to FIG. 15, the principle of the magnetic pole position detection by the brushless motor driving circuit will be described.

FIGS. 15(a) to 15(f) are diagrams illustrating the principle of the magnetic pole position detection by the brushless motor driving circuit. FIG. 15(a) shows waveforms of the u, v, and w lines of an induced voltage of the brushless motor. FIG. 15(b) shows waveforms of line currents of the u, v, and w lines caused by a driving voltage of the brushless motor 18. FIG. 15(c) shows a waveform of a terminal voltage 1201 of the u line output from a first-order lag filter 20a (see FIG. 14). FIG. 15(d) shows a waveform of an output voltage 1202 of a comparator 20b into which the u-line terminal voltage 1201 is input (see FIG. 14). FIG. 15(e) shows a waveform of an integral voltage obtained by integrating the comparator output voltage 1202. FIG. 15(f) shows a waveform of an output voltage of a comparator (included in the control circuit 21) into which the integral voltage is input. The u-line terminal voltage is simply referred to also as the u-line voltage. The other line voltages are referred to in the same way.

In the brushless motor driving circuit, a line current is supplied to the armature winding of the brushless motor 18 only in a phase angle of 120 degrees by the three-phase bridge circuit 19, and the current is not supplied in a phase angle of 60 degrees. In the non-current-supplying period in which the current is not supplied, a voltage induced in the armature winding is detected by the voltage phase detecting circuit 20. In FIG. 15(c), the non-current-supplying period in which the u-line current does not flow is designated by θu. As shown in the figure, in the non-current-supplying period θu, only the u-line induced voltage appears. As shown in FIG. 15(c), a high frequency voltage caused by PWM is smoothed by the first-order lag filter 20a.

As shown in FIG. 15(b), the line current is an AC current of a square wave at a phase angle of about 120 degrees, and its fundamental wave flows so as to be in line with the induced voltage of each phase. Because the brushless motor is originally a synchronous motor, the frequency of the voltage is proportional to the number of rotation. The voltage phase detecting circuit 20 is configured so as to detect a timing when the induced voltage of each line becomes zero. For three phases, such a timing appears 6 times in one cycle. The number of rotation can be detected by measuring the intervals between respective timings. By using this, a feedback loop is configured, and the number of rotation is controlled by using the output of the number of rotation controller as a voltage instruction. Usually, this control is performed by using a microcomputer. In FIG. 15(c), the timing of the zero cross is-designated by $θ_0$.

Specifically, in the brushless motor driving circuit, the current supply is sequentially performed in respective phases for every 120 degrees on the three-phase terminals of the brushless motor 18. In contrast, by using the 60-degree period as a non-current-supplying period, the induced voltage of the brushless motor 18 is detected. The field magnetic poles are switched over at a zero-cross timing (in FIG. 15(f), designated by $θ'_0$) of a waveform which is obtained by delaying the induced voltage waveform by 90 degrees.

In the above-described configuration of the conventional brushless motor driving circuit, the induced voltage is a voltage proportional to the rotation speed. At the starting of the motor, therefore, the induced voltage has a very small value. In addition, the terminal voltage is subjected to pulse width modulation, and hence a low-pass filter (the first-order lag filter 20a) for removing the pulse width modulation signal is used. As shown in FIG. 15(c), the induced voltage which is actually used has a further reduced amplitude, so that it is very difficult to detect the induced voltage. Accordingly, the rotational phase cannot be substantially detected. At the starting, therefore, it is impossible to drive the brushless motor by using the above-mentioned induced voltage waveform.

To comply with this, a technique is employed in which, at the starting, the V/f converting circuit 1213 is used in the same manner as the case of an induction motor and the like, so as to perform a V/f control which is a control for maintaining a uniform relationship between a voltage and a frequency. Thereafter, at a timing when the induced voltage can be detected, the control is switched to the above-described control using the induced voltage waveform, by means of the judging circuit 1212 and the selector switches 1214a to 1214c.

At the switching from the starting control to the normal control, an excessive current may flow because of a delay of the control or the deviation of parameters. For this reason, the technique has problems such as that it is necessary to use large-size power transistors for motor driving, and that there is a possibility that the permanent magnet is demagnetized by the excessive current.

There exists another problem in that, in the case where low-speed rotation in which the induced voltage cannot be detected is to be maintained, it is difficult to control the number of rotation by the starting control method described above.

Even if the induced voltage in the low speed rotation is tried to be detected by increasing the accuracy of the detecting circuit, the time width in which the induced voltage superimposed on a pulse width modulation signal can be detected is very narrow because a low voltage is applied at the start and in a low speed rotation and the ON duty of the pulse width modulation is small. Such a control can be realized by a microcomputer. There is a time lag between the ON timing instruction output from the microcomputer and the actual ON timing of the switching element. If the ON time width is narrow, therefore, an erroneous detection timing may occur. Accordingly, there exists a further problem in that it is difficult to control the low speed rotation with good accuracy.

SUMMARY OF THE INVENTION

The invention has been conducted in order to solve the problems. It is an object of the invention to provide a brushless motor driving circuit which can drive a brushless motor by using the same control method and without requiring the switching from the starting control to the normal control.

The 1st invention of the present invention is a brushless motor driving circuit comprising:
 a three-phase bridge circuit which outputs a signal which is subjected to pulse width modulation;
 a brushless motor which is connected to and driven by said three-phase bridge circuit;
 terminal voltage detecting means for detecting a terminal voltage of a phase in which a current supply to said brushless motor is stopped; and
 controlling means for controlling the current supply to said three-phase bridge circuit based on a result of the detection by said terminal voltage detecting means,
 wherein said terminal voltage detecting means is adjusted so that a time constant at falling of the detected pulse-like voltage is larger than a time constant at rising.

The 2nd invention of the present invention is a brushless motor driving circuit comprising: (1) a three-phase bridge circuit; (2) a brushless motor which is connected to and driven by said three-phase bridge circuit; (3) reference voltage outputting means for outputting a voltage corresponding to a preset number of rotation of said brushless motor as a motor driving voltage reference value; (4) pulse generating means for generating a pulse for sampling three-phase pulse at a same frequency; (5) terminal voltage detecting means for detecting a terminal voltage of at least one line in a non-current-supplying period of said brushless motor; and (6) a comparator which compares a value of the detected terminal voltage at rising with a value at falling, the driving voltage reference value being variable in accordance with an output of said comparator, Wherein at a timing after an intermediate timing in the non-current-supplying period, (a) if the detected induced voltage at rising is a potential which is equal to or higher than a predetermined value, or (b) if the detected induced voltage at falling is a potential which is equal to or lower than a predetermined value, a frequency phase of said pulse generating means is adjusted to lead.

The 3rd invention of the present invention is a brushless motor driving circuit comprising: (1) a three-phase bridge circuit; (2) a brushless motor which is connected to and driven by said three-phase bridge circuit; (3) reference voltage outputting means for outputting a voltage corresponding to a preset number of rotation of said brushless motor as a motor driving voltage reference value; (4) pulse generating means for generating a three-phase pulse at a same frequency; (5) terminal voltage detecting means for detecting a terminal voltage of at least one line in a non-current-supplying period of said brushless motor; and (6) a comparator which compares a value of the detected terminal voltage at rising with a value at falling, the driving voltage reference value being variable in accordance with an output of said comparator, Wherein at a timing after an intermediate timing in the non-current-supplying period, (a) if the detected induced voltage is a voltage of a line of an increasing voltage and the induced voltage value is a potential which is lower than a predetermined voltage between a power-source potential on a plus side and a power-source potential on a minus side, or (b) if the detected induced voltage is a voltage of a line of a decreasing voltage and the induced voltage value is a potential which is higher than a predetermined voltage between a power-source potential on a plus side and a power-source potential on a minus side, a frequency phase of said pulse generating means is caused to lag.

The 4th invention of the present invention is a brushless motor driving circuit comprising:
 a three-phase bridge circuit;
 a brushless motor which is connected to and driven by said three-phase bridge circuit;
 first detecting means for detecting a terminal voltage of a line in which a current supply to said brushless motor is stopped;
 second detecting means for detecting a terminal voltage of a line in which a current supply from a plus side of a power-source voltage is conducted by means of pulse width modulation or continuously;
 third detecting means for detecting a terminal voltage of a line in which a current supply from a minus side of the power-source voltage is conducted by means of pulse width modulation or continuously; and
 controlling means for controlling a current supply to said three-phase bridge circuit by performing pulse width modulation on the plus side or on the minus side of the power-source voltage, wherein a result of the detection by said second detecting means and a result of the detection by said third detecting means is used in a calculation of an amount of modulation of the pulse width modulation as power-source voltage information.

The 5th invention of the present invention is a brushless motor driving circuit comprising:

a three-phase bridge circuit;

a brushless motor which is connected to and driven by said three-phase bridge circuit;

first detecting means for detecting a terminal voltage of a line in which a current supply to said brushless motor is stopped;

second detecting means for detecting a terminal voltage of a line in which a current supply from a plus side of a power-source voltage is conducted by means of pulse width modulation or continuously;

third detecting means for detecting a terminal voltage of a line in which a current supply from a minus side of the power-source voltage is conducted by means of pulse width modulation or continuously; and controlling means for controlling a current supply to said three-phase bridge circuit by performing pulse width modulation on the plus side or on the minus side of said power-source voltage, wherein said controlling means compares a half of a difference between a result of the detection by said second detecting means and a result of the detection by said third detecting means with a detection value of said first detecting means, and switches over a current-supplying phase at a timing delayed by a predetermined angle from a timing when a result of the comparison is inverted.

The 6th invention of the present invention is a brushless motor driving circuit according to said 5th invention, wherein said controlling means does not use a result of the comparison which is obtained immediately after the current-supplying phase is switched over.

The 7th invention of the present invention is a brushless motor driving circuit comprising: a three-phase bridge circuit;

a brushless motor which is connected to and driven by said three-phase bridge circuit;

detecting means for detecting a terminal voltage of a line in which a current supply to said brushless motor is stopped; and controlling means for controlling the current supply to said three-phase bridge circuit based on a result of the detection by said terminal voltage detecting means, wherein said controlling means compares the result of the detection by said detecting means with a neutral point potential of a power-source voltage, and (a) if the result of the detection by said detecting means is in an increasing direction, said controlling means detects a first timing period in which the result of the detection by said detecting means becomes lower than the neutral point potential for a first time after phase switching, and a second timing when said detection result subsequently becomes higher than the neutral point potential, (b) if the result of the detection by said detecting means is in a decreasing direction, said controlling means detects a third timing period in which the result of the detection by said detecting means becomes higher than the neutral point potential for a first time after phase switching, and a fourth timing when said detection result subsequently becomes lower than the neutral point potential, (c) if the result of the detection by said detecting means is in an increasing direction, said controlling means detects the second timing, and then performs phase switching at a timing delayed by a value obtained by subtracting a half of said third timing period from a predetermined current-supplying angle, and (d) if the result of the detection by said detecting means is in a decreasing direction, said controlling means detect s the fourth timing, and then performs phase switching at a timing delayed by a value obtained by subtracting a half of said first timing period from a predetermined current-supplying angle.

The 8th invention of the present invention is a method of controlling a brushless motor driving circuit comprising: (1) a three-phase bridge circuit; (2) a brushless motor which is connected to and driven by said three-phase bridge circuit; (3) reference voltage outputting means for outputting a voltage corresponding to a preset number of rotation of said brushless motor as a motor driving voltage reference value; (4) pulse generating means for generating a pulse for sampling three-phase pulse at a same frequency; (5) terminal voltage detecting means for detecting a terminal voltage of at least one line in a non-current-supplying period of said brushless motor; and (6) a comparator which compares a value of the detected terminal voltage at rising with a value at falling, the driving voltage reference value being variable in accordance with an output of said comparator, wherein, at a timing after an intermediate timing in the non-current-supplying period, (1) if the detected induced voltage is (1–a) a potential which is equal to or higher than a predetermined value at rising, or (1–b) a potential which is equal to or lower than a predetermined value at falling, the frequency phase of said pulse generating means is controlled to lead, and (2) if the detected induced voltage is (2–a) a potential which is equal to or lower than a predetermined value at rising, or (2–b) a potential which is equal to or lower than a predetermined value at falling, the frequency phase of said pulse generating means is controlled to lag.

The 9th invention of the present invention is a method of controlling a brushless motor driving circuit comprising: a three-phase bridge circuit; a brushless motor which is connected to and driven by said three-phase bridge circuit; first detecting means for detecting a terminal voltage of a line in which a current supply to said brushless motor is stopped; second detecting means for detecting a terminal voltage in a current-supplying condition of a line in which a current supply from a plus side of power-source voltage is conducted by means of pulse width modulation or continuously; third detecting means for detecting a terminal voltage in a current-supplying condition of a line in which a current supply from a minus side of power-source voltage is conducted by means of pulse width modulation or continuously; and controlling means for controlling a current supply to said three-phase bridge circuit by performing pulse width modulation on the plus side or on the minus side of said power-source voltage, wherein said controlling means compares a half of a difference between a result of the detection by said second detecting means and a result of the detection by said third detecting means with a detection value of said first detecting means, and switches over a current-supplying phase at a timing delayed by a predetermined angle from a timing when a result of the comparison is inverted.

The 10th invention of the present invention is a method of controlling a brushless motor driving circuit wherein at the starting of said brushless motor, said method of controlling a brushless motor driving circuit according to said 8th invention is used, and, when it is detected that a difference between an induced voltage at rising and an induced voltage at falling is continuously in a predetermined range for a predetermined period, the method is switched to said method of controlling a brushless motor driving circuit according to said 9th invention.

BRIEF DESCRIPTION OF THE DRAWINGS

FIGS. 15(a) to 15(f) are diagrams illustrating the principle of the magnetic pole position detection by the brushless motor driving circuit of the prior art.

Figure 1:
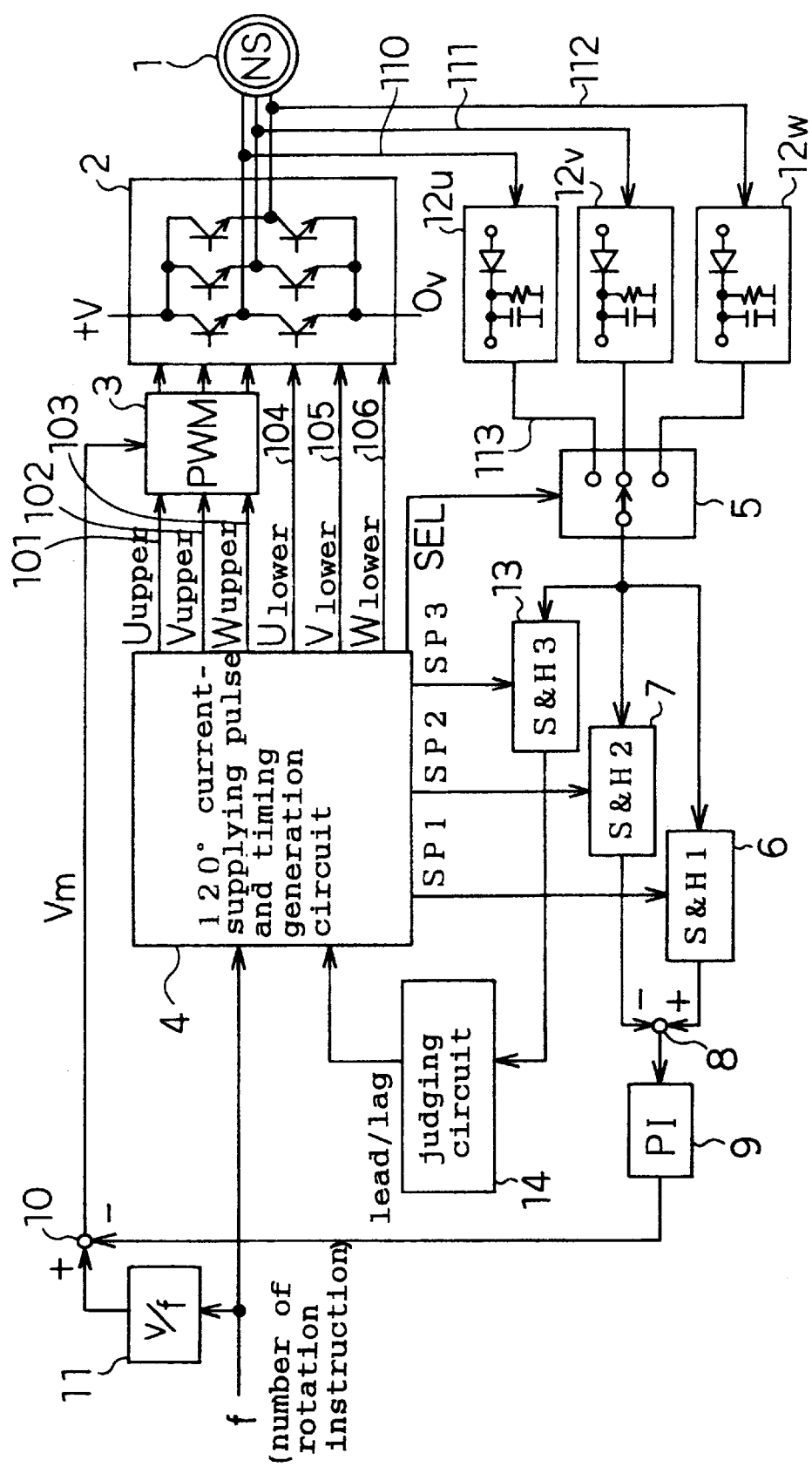
FIG. 1 is a block diagram of a brushless motor driving circuit of Embodiment 1 of the invention.

LEGEND OF REFERENCE NUMERALS 1, 18 brushless motor
2, 19 three-phase bridge circuit
PWM modulating circuit
120-degree current-supplying pulse and timing generation circuit
5 selecting circuit
6, 7, 13 sample and hold circuit
8, 10 comparing circuit
9 control compensation circuit
11 V/f converting circuit
12u, 12v, 12w terminal voltage waveform processing circuit
14 judging circuit
20 voltage phase detecting circuit
21 control circuit
22 voltage doubler rectifying circuit
23 AC power source

DESCRIPTION OF THE PREFERRED EMBODIMENTS

Hereinafter, the invention will be described with reference to the drawings showing embodiments thereof.

Embodiment 1

FIG. 1 is a block diagram showing the configuration of a brushless motor driving circuit according to Embodiment 1 of the invention (corresponding to claims 1, 2, and 3). With reference to the figure, the configuration of the embodiment and the operations of circuits will be briefly described.

As shown in FIG. 1, a number of rotation (frequency) instruction f is supplied to a V/f converting circuit 11, and also to a 120-degree current-supplying pulse and timing generation circuit 4.

The 120-degree current-supplying pulse and timing generation circuit 4 generates 120-degree current-supplying pulses (U-upper, V-upper, W-upper, U-lower, V-lower, and W-lower signals) of the same frequency, and related timing pulse signals (SEL, SP1, SP2, and SP3 signals). Among the signals, the U-upper (101), V-upper (102), and W-upper (103) signals are supplied to a three-phase bridge circuit 2 via a PWM modulation circuit 3, in the same manner as the U-lower (104), V-lower (105), and W-lower (106) signals. The-three-phase bridge circuit 2 produces a pseudo three-phase AC current from a DC power source (+V and 0). The PWM modulation circuit 3 performs modulation (multiplication) on the U-upper, V-upper, and W-upper signals with an output (Vm) of a first comparing circuit 10. The three-phase bridge circuit 2 includes bridges (U, V, and W) of three phases. Signals which turn ON transistors on the upper side (+V side) in respective phases are indicated as the U-upper, V-upper, and W-upper signals, and those which turn ON transistors on the lower side (0V side) as the U-lower, V-lower, and W-lower signals. Although not shown in the figure, in an actual circuit, predrive circuits for driving respective transistors are required. An output of the three-phase bridge circuit 2 is connected to a brushless motor 1, and also to a selecting circuit 5 via terminal voltage waveform processing circuits 12u, 12v, and 12w.

A selecting instruction SEL of the selecting circuit 5 is supplied from the 120-degree current-supplying pulse and timing generation circuit 4. An output of the selecting circuit 5 is fed to three sample and hold circuits 6, 7, and 13, to be sampled and held by respectively corresponding sample pulses SP1, SP2, and SP3. Outputs of the sample and hold circuits 6 and 7 are fed to a second comparing circuit 8 to obtain the difference between the outputs. The difference is fed to a control compensation circuit 9. An output of the sample and hold circuit 13 is fed to a judging circuit 14, and a timing phase of the 120-degree current-supplying pulse and timing generation circuit 4 is modulated. The control compensation circuit 9 is used for setting an output of the second comparing circuit 8 to be zero and stabilizing the control system. Parameters of the control compensation circuit 9 are previously determined. An output of th e control compensation circuit 9 is fed to a comparing circuit 10. The comparing circuit 10 obtains the difference between an output of the V/f converting circuit 11 and that of the control compensation circuit 9. The obtained value is used as a motor driving voltage Vm. The motor driving voltage Vm is used by the PWM modulation circuit 3 as a duty ratio for turning ON the upper transistors of the three-phase bridge circuit 2, and corresponds to the driving voltage of the brushless motor 1.

In the embodiment, the 120-degree current-supplying pulse and timing generation circuit 4, the sample and hold circuits 6, 7, and 13, the control compensation circuit 9, and the like constitute control ling means, and the comparing circuit 10 and the V/f converting circuit 11 constitute reference volt age outputting means.

Next, output signals by the 120-degree current-supplying pulse and timing generation circuit 4 will be described.

Figure 2:
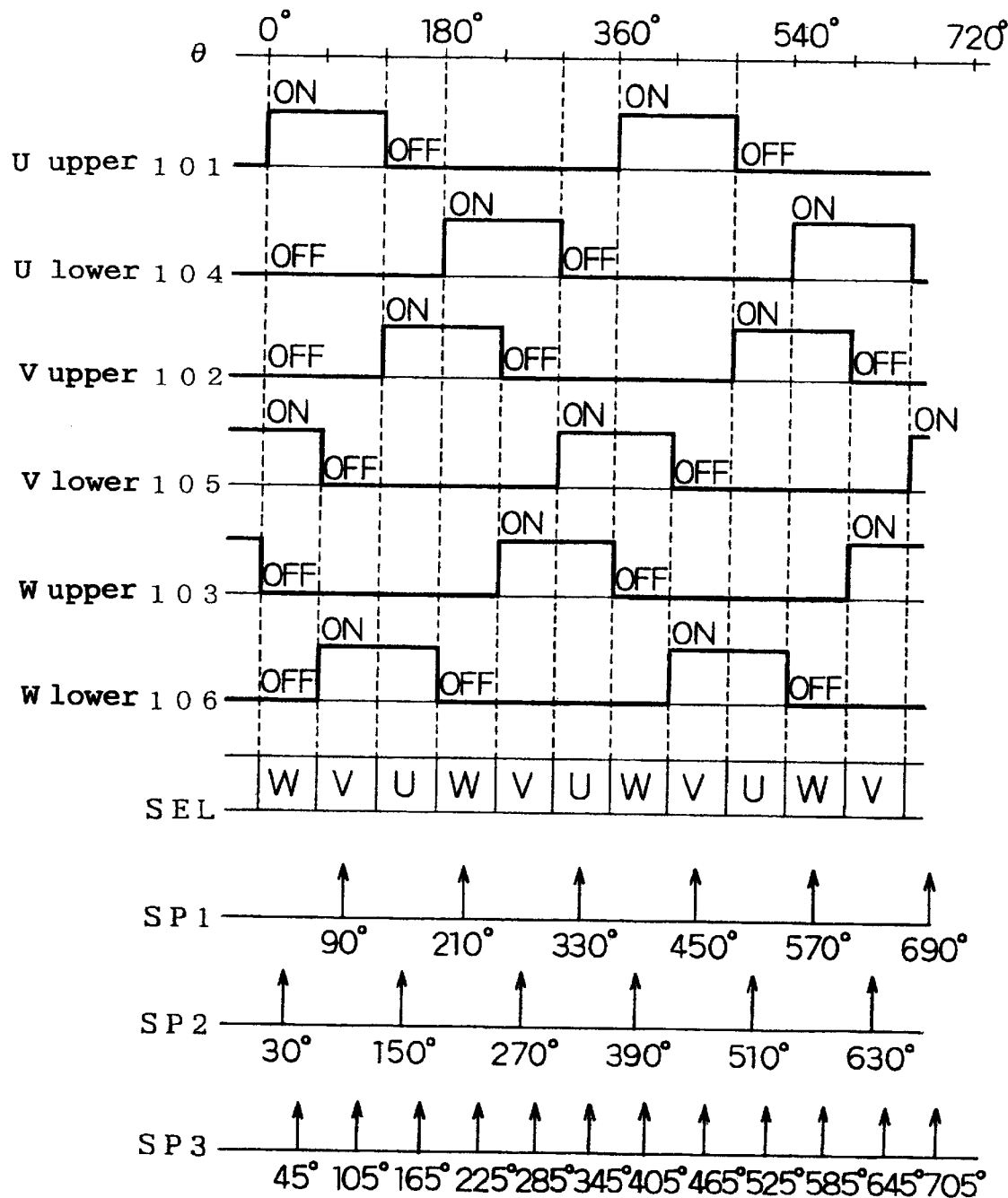
FIG. 2 is a waveform chart showing various timings in the brushless motor driving circuit of Embodiment 1.

FIG. 2 i s a timing chart of the output signals of the 120-degree current-supplying pulse and timing generation circuit 4. In FIG. 2, θ denotes an electrical angle, and FIG. 2 shows the electrical angle of about 720 degrees, that is, an angle corresponding to two periods.

The 120-degree current-supplying pulse and timing generation circuit 4 outputs the U-upper, U-lower, V-upper, V-lower, W-upper, and W-lower signals to the three-phase bridge circuit 2. The U-upper signal produces an instruction for turning ON the transistor only for periods of the electrical angle θ of 0 to 120 degrees, and 360 to 480 degrees. The U-lower signal outputs an instruction for turning ON the transistor only for periods of the electrical angle θ of 180 to 300 degrees, and 540 to 680 degrees. The V-upper signal outputs an instruction for turning ON the transistor only for periods of the electrical angle θ of 120 to 240 degrees, and 480 to 600 degrees. The V-lower signal outputs an instruction for turning ON the transistor only for periods of the electrical angle θ of 300 to 420 degrees, and −60 to +60 degrees. The W-upper signal outputs an instruction for turning ON the transistor only for periods of the electrical angle θ of 240 to 360 degrees, and −120 to 0 degree. The W-lower signal outputs an instruction for turning ON the transistor only for periods of the electrical angle θ of 60 to 180 degrees, and 420 to 540 degrees.

The 120-degree current-supplying pulse and timing generation circuit 4 supplies an SEL signal to the selecting circuit S. The selecting instruction SEL which is a signal to the selecting circuit 5 is output so that the selecting circuit 5 selects the terminal voltage of the W line for a period of the electrical angle θ of 0 to 60 degrees, of the V line for a period of 60 to 120 degrees, and of the U line for a period of 120 to 180 degrees. Thereafter, the selecting instruction SEL is repetitively output so that the selecting circuit 5 selects the each terminal voltage in the order of W, V, and U-line for every 60 degrees.

In addition, the 120-degree current-supplying pulse and timing generation circuit 4 supplies signals of SP1, SP2, and SP3 to the sample and hold circuits 6, 7, and 13. The sampling pulses SP1 and SP2 to the sample and hold circuits 6 and 7 are output for every 120 degrees of the electrical angle θ. Specifically, to the sample and hold circuit 6, the pulse SPs is output for every 120 degrees of the electrical angle θ, or at 90, 210, and 330 degrees. To the sample and hold circuit 7, the pulse SP2 is output for every 120 degrees, or at 30, 150, and 270 degrees.

By contrast, the pulse SP3 is output for every 60 degrees of the electrical angle θ, or at 45, 105, 165, 225, 285, and 345 degrees, and supplied to the sample and hold circuit 13. The output of the sample and hold circuit 13 is supplied to the judging circuit 14. In accordance with the judgment result, the timing phase of the timing pulses generation circuit 4 is modulated.

Next, the terminal voltage waveform processing circuits 12u, 12v, and 12w in FIG. 1 will be described with reference to FIGS. 3(a) and 3(b). FIG. 3(a) shows a waveform of one terminal voltage 110 of the brushless motor 1 shown in FIG. 1. In the figure, a waveform in a time period corresponding to a range of about 300 to 400 degrees of the electrical angle θ shown in FIG. 1 is schematically shown. The terminal voltage 110 is supplied to the terminal voltage waveform processing circuit 12u. FIG. 3(b) is a diagram of a waveform of an output voltage 113 of the terminal voltage waveform processing circuit 12u. The output voltage 113 is used as an input voltage of the selecting circuit 5.

At the starting or the like, the number of rotation of the motor is low, and hence the ON pulse duty ratio by PWM is small. Since induced voltage information is included in the ON period 301, it is necessary to observe a momentary voltage which appears in the form of a pulse having a narrow width. In the embodiment, 12u, 12v, and 12w in FIG. 1 denote peak hold circuits which, at rising, have a time constant of substantially zero and, at falling, have a time constant due to a resistor and a capacitor. Accordingly, as shown in FIG. 3(b), it is possible to output the terminal voltage (induced voltage) while processing the voltage so as to have a waveform in which the pulse width is substantially made wider, that is, a waveform which can be easily observed.

Next, the operation of the brushless motor driving circuit according to Embodiment 1 shown in FIG. 1 will be described.

In the brushless motor driving circuit of the embodiment, first, the number of rotation instruction f is converted into a driving voltage reference value Vm by the V/f converting circuit 11. The driving voltage reference value Vm is supplied to the three-phase bridge circuit 2 via the PWM modulating circuit 3. The current is sequentially supplied from the three-phase bridge circuit 2 to the three-phase terminals of the brushless motor 1 by every 120 degrees, thereby driving the brushless motor 1.

For each phase of the brushless motor 1, in a non-current-supplying period in which a current is not supplied, the induced voltage of the phase is detected by the selecting circuit 5. At this time, since the sample and hold circuits 6 and 7, the comparator 8, the control compensation circuit 9, and the comparator 10 constitute a feedback loop, the difference between the induced voltage at rising and that at falling is obtained by the combination of the sample and hold circuits 6 and 7 and the comparator 8. In accordance with the difference, the driving voltage reference value Vm output from the V/f converting circuit 11 is varied. Thus, the number of rotation of the brushless motor 1 is controlled so that a mechanical angle of the brushless motor 1 follows the electrical angle θ. The operations of the sample and hold circuits 6 and 7, and the comparator 8 will be described later in more detail.

Next, the above-described operation will be further specifically described with separating the operation into the starting control operation and the normal control operation.

In the brushless motor driving circuit, at starting, a method in which the number of rotation instruction f is gradually increased from a very slow speed is adopted in the same manner as the prior art. That is, at starting, an applying voltage is low and also the induced voltage is low, and hence the output values from the sample and hold circuits 6 and 7 are substantially equal to each other, irrespective of the difference between the electrical angle θ and the mechanical angle. Thus, the output from the comparing circuit 10 is substantially equal to that of the V/f converting circuit 11. In the starting control operation, therefore, the starting method is eventually identical with that for the prior art driving circuit shown in FIG. 14.

When the number of rotation of the brushless motor 1 is thereafter increased and the induced voltage is started to be observed, the driving voltage spontaneously enters the condition in which the driving voltage is automatically controlled at each time to an appropriate value with respect to the number of rotation and the load of the motor.

Figure 14:
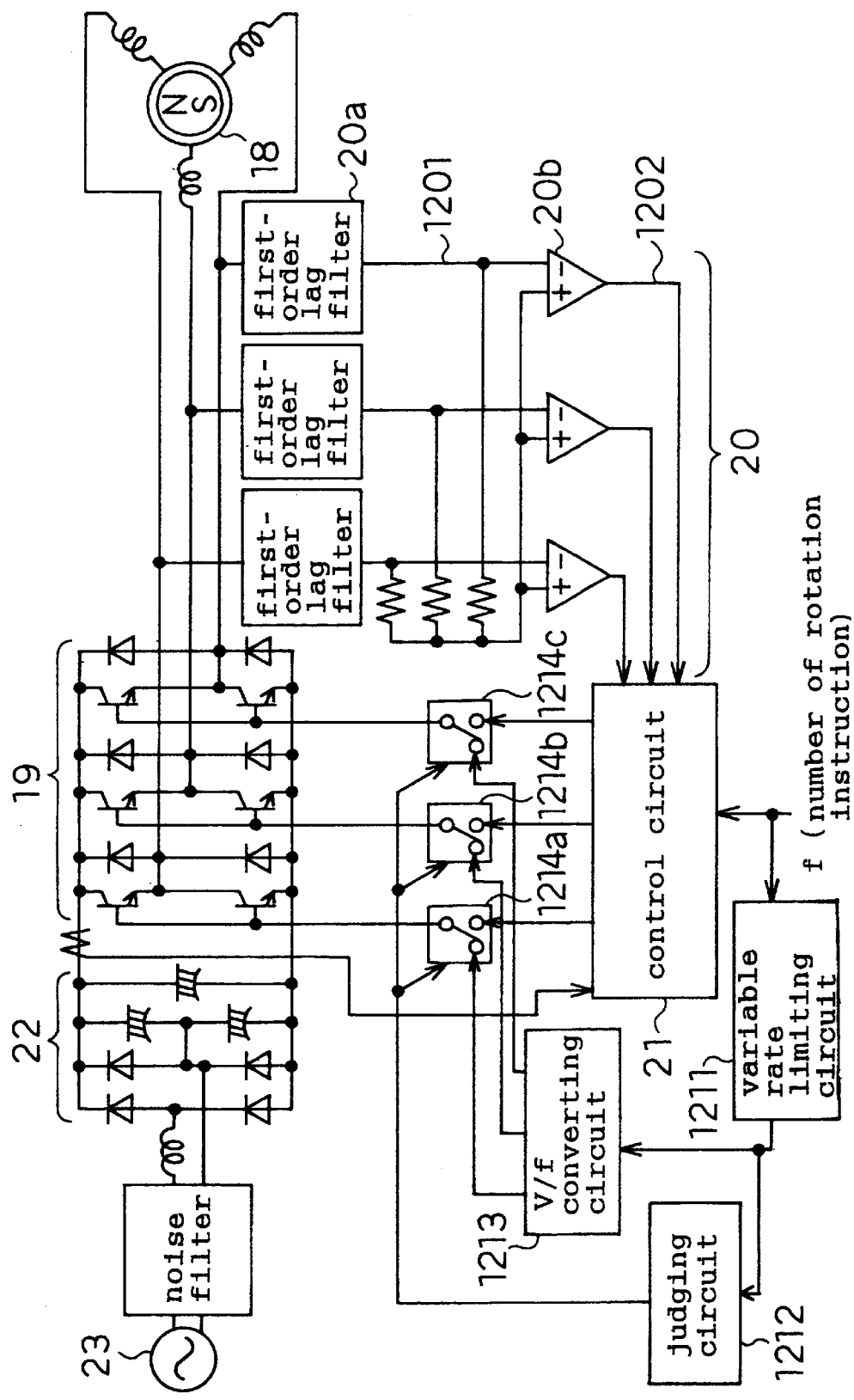
FIG. 14 is a block diagram of a brushless motor driving circuit of the prior art.

Accordingly, unlike the prior art driving circuit shown in FIG. 14, in the driving circuit, the switching operation from the starting control to the normal control is not required.

Next, as described above, the operations of the sample and hold circuits 6 and 7 and the comparator 8 will be described in more detail with reference to FIGS. 4(*a*) to 4(*c*).

Figure 3:
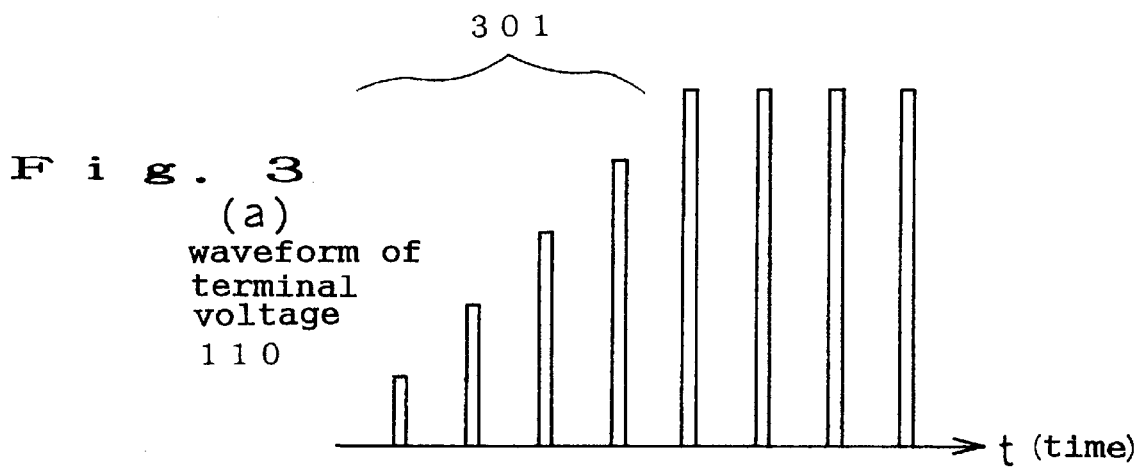
FIG. 3 is a waveform chart of signals in the brushless motor driving circuit of Embodiment 1.
Figure 3:
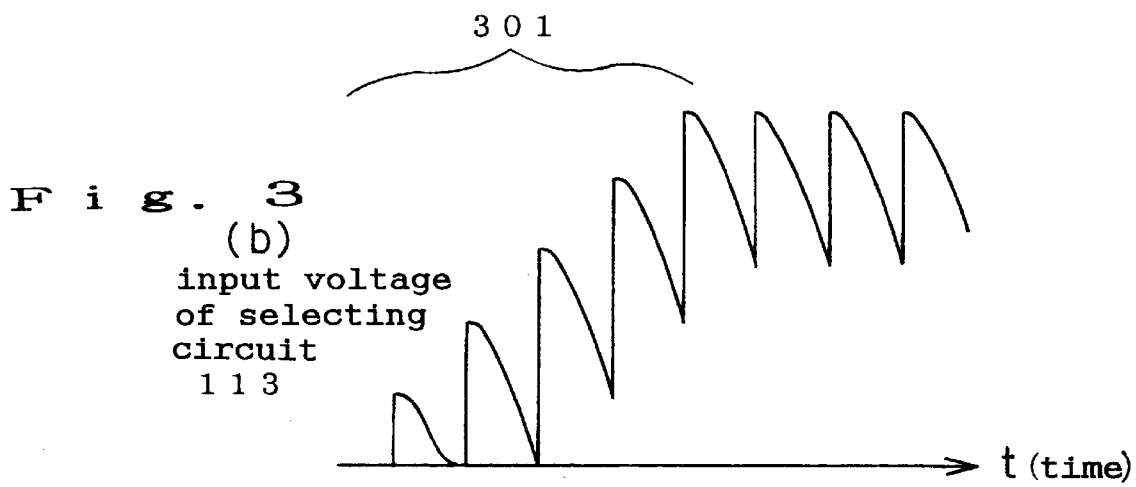
Figure 4:
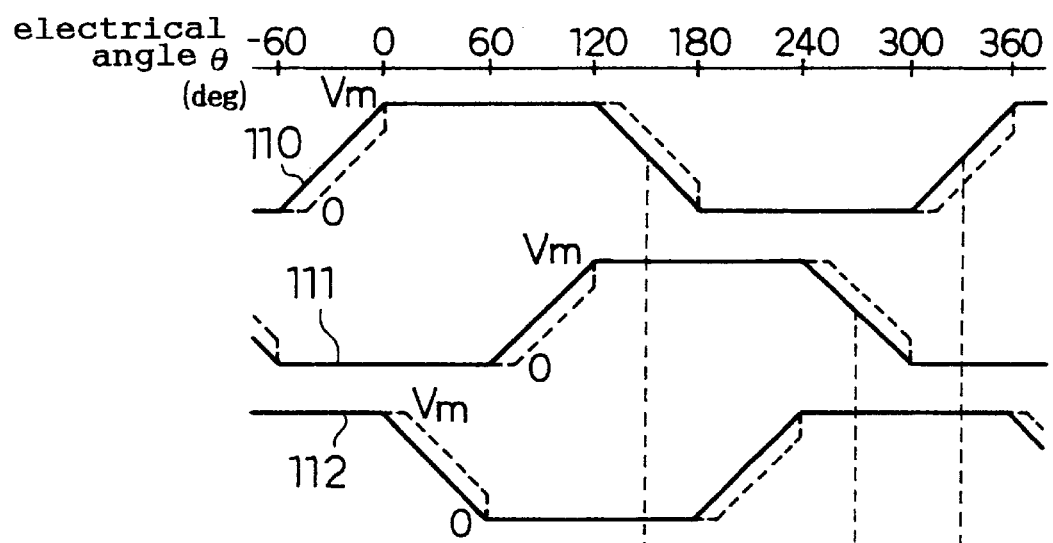
FIG. 4(a) is a waveform chart of terminal voltages in the brushless motor driving circuit of Embodiment 1.
FIG. 4(b) is a chart of timing signals in the brushless motor driving circuit of Embodiment 1.
FIG. 4(c) is a chart showing output voltages of sample and hold circuits in Embodiment 1.
Figure 4:
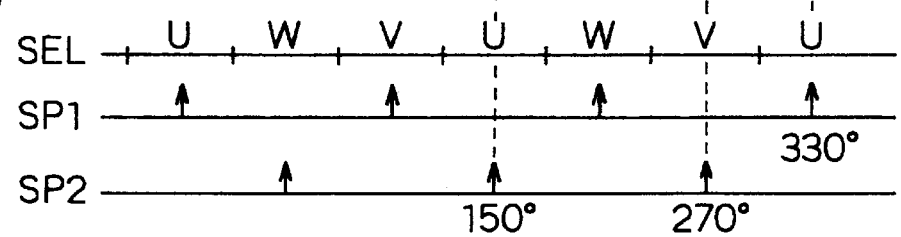
Figure 4:
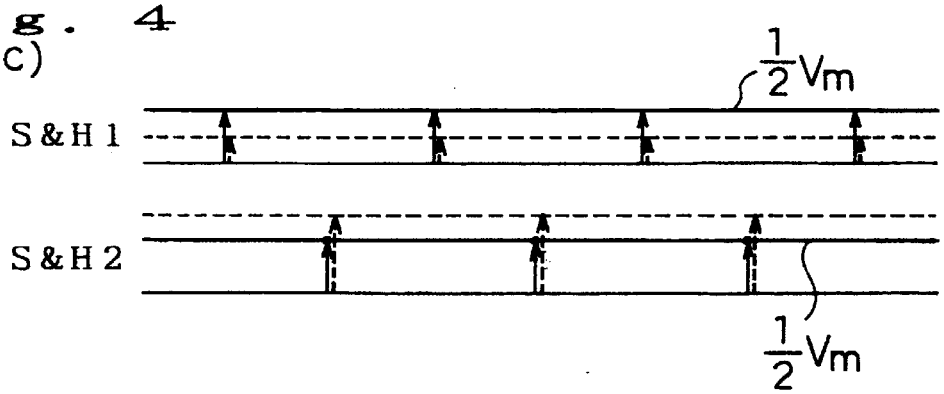

FIG. 4(*a*) shows waveforms of the terminal voltages 110, 111, and 112 of the U to W lines of the brushless motor driving circuit shown in FIG. 1. FIGS. 4(*a*) to 4(*c*) show the electrical angle θ from −60 to +360 degrees. In FIG. 4(*a*), broken lines show a waveform of the terminal voltage in the case where the mechanical angle lags with respect to the electrical angle. The terminal voltages have PWM waveforms as shown in FIG. 3(*a*), but are continuously depicted in the figure for the sake of clearity.

As shown in FIG. 4(*a*), in the range of the electrical angle θ of 0 to 120 degrees, the value of the U-line terminal voltage 110 of the motor 1 is Vm because the transistor of the three-phase bridge circuit 2 is turned ON by the U-upper signal 101 (see FIG. 2). Since the transistor is turned ON by the U-lower signal 104 in the range of the electrical angle θ of 180 to 300 degrees, the terminal voltage 110 is 0. In the periods of the electrical angle θ of −60 to 0 degree and 120 to 180 degrees, both the transistors are turned OFF by the U-upper and U-lower signals 101 and 104. In these periods, the induced voltage of the motor 1 can be observed. That is, when the brushless motor 1 is efficiently driven, the applying voltage is in phase with the induced voltage. In this case, therefore, in the range of the electrical angle θ of −60 to 0 degree, the induced voltage has a rising waveform from 0 to Vm as shown by the solid line in FIG. 4(*a*). By contrast, in the range of the electrical angle θ of 120 to 180 degrees, the induced voltage has a falling waveform from Vm to 0.

As a result, the observed waveform of the U-line terminal voltage 110 has a trapezoidal shape. The V-line terminal voltage 111 has the same waveform as that of the U line, but lags in phase by 120 degrees. The W-line terminal voltage 112 also has a waveform which lags by 240 degrees from that of the U line.

Next, the case in which the load is increased and the driving voltage is insufficient will be described.

When the driving voltage is insufficient, the motor 1 is short of torque and a phase lag is caused with respect to the driving signal. Thus, the phase lag also occurs in the waveform of the induced voltage. The waveform is indicated by the broken lines in FIG. 4(*a*). Specifically, in a rising portion of the induced voltage, the voltage is lower than that in the case where a phase lag does not occur. By contrast, in a falling portion, the voltage is higher.

FIG. 4(*b*) is a diagram showing the selecting instruction SEL, and the sampling pulses SP1 and SP2 which have been described with reference to FIG. 2. In accordance with the signals, the terminal voltage in which only an induced voltage appears is sampled. FIG. 4(*c*) is a diagram showing S&H1 and S&H2 which are the output results of the sample and hold circuits 6 and 7.

As shown in these figures, for example, the case will be described in which the V-line terminal voltage at 270 degrees is sampled by SP2, and the U-line terminal voltage at 330 degrees is sampled by SP1.

Specifically, if the driving voltage is normal, both the output voltages S&H1 and S&H2 of the sample and hold circuits 6 and 7 are Vm/2, as shown by the solid lines in FIG. 4(*c*). If the driving voltage is insufficient, the output voltage S&H1 is lowered and the output voltage S&H2 is conversely raised, as shown by the broken lines. The outputs S&H1 and S&H2 of the sample and hold circuits 6 and 7 are supplied to the comparing circuit 8. A difference is obtained by subtracting S&H2 from S&H1 and the motor applying voltage Vm is subtracted via the control compensation circuit 9.

As described above, if the driving voltage is insufficient, the output voltage S&H1 of the sample and hold circuit 6 is lowered, and also the output of the comparing circuit 8 is decreased. As a result, the output of the control compensation circuit 9 decreases, and the output Vm of the comparing circuit 10 increases, so that the control is performed so as to raise the driving voltage. Accordingly, the control is performed so as to adjust the driving voltage to be appropriate in accordance with the load.

Unlike the prior art, therefore, the rotation of the brushless motor can be controlled with high accuracy and without requiring means for switching the starting control to the normal control.

In the embodiment, in the case where the difference between the induced voltage at the rising and the induced voltage at the falling is obtained, as the interval of sampling timings of the voltages is shorter, the control can be performed with higher accuracy. Thus, the case in which sample values in different phases are used has been described, but the invention is not limited to this case. For example, sample values in the same phase may be used. In this case, for example, a sampled value at 150 degrees is used as the induced voltage at falling, and a sampled value at 330 degrees is used as the induced voltage at rising.

In the embodiment, two sample and hold circuits are disposed, and the difference between the outputs of the two circuits is obtained. The invention is not limited to this configuration. For example, an induced voltage at one of falling and rising may be sampled, and the sampled voltage may be compared with the value of Vm/2 which is obtained when no phase shift occurs.

Next, with reference to FIGS. 5 and 6, the operation of the judging circuit 14 will be described.

Figure 5:
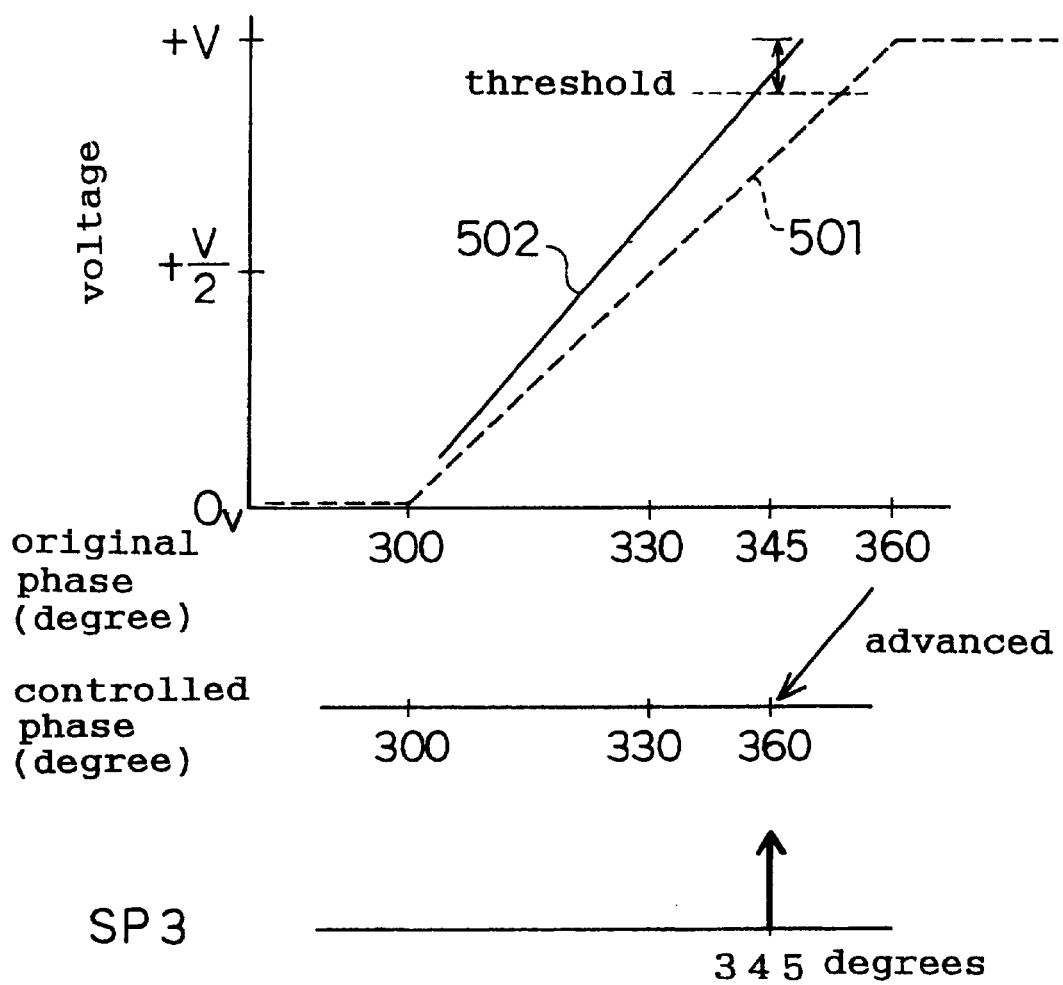
FIG. 5 is a waveform chart showing the principle of a phase advancing adjustment in the brushless motor driving circuit of Embodiment 1.
Figure 6:
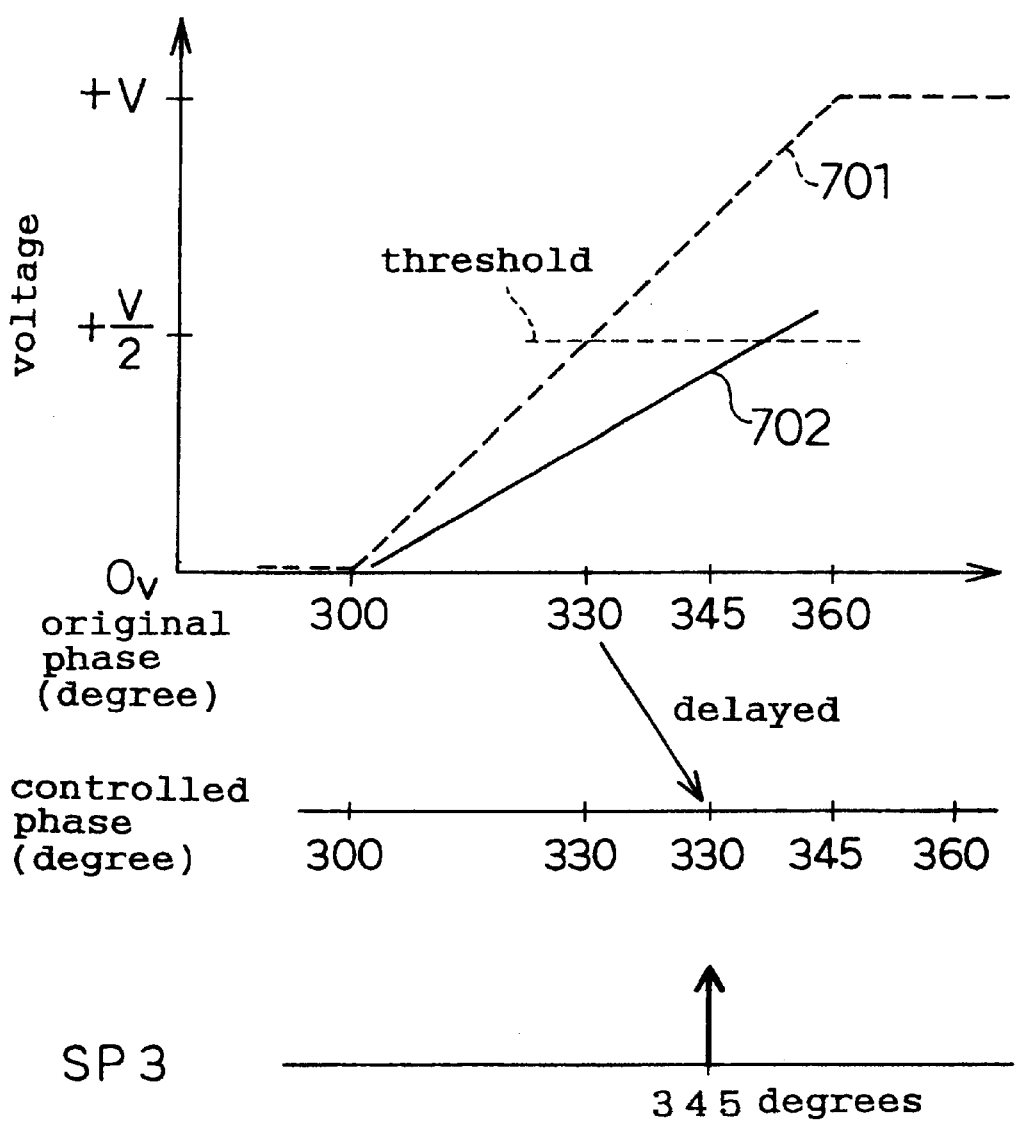
FIG. 6 is a waveform chart showing the principle of a phase delaying adjustment in the brushless motor driving circuit of Embodiment 1.

If the rotation phase is normal, in other words, if no phase shift occurs, terminal voltages shown by the broken lines in FIGS. 5 and 6 (in the figures, designated by the reference numerals 501 and 701) are observed. The terminal voltages shown in the figures correspond to the output voltage 113 of the terminal voltage waveform processing circuit 12*u* shown in FIG. 1.

Next, referring to FIG. 5, the judgment and processing in the case where the actual rotation phase (mechanical angle) leads the control phase (electrical angle) will be described. If the rotation phase leads, the terminal voltage rapidly rises as shown by the solid line (in the figure, designated by the reference numeral 502).

In such conditions, as shown in FIG. 2, the selecting instruction signal SEL indicates the selection of the U line in the period of the electrical angle θ of 300 to 360 degrees. In addition, the sampling pulse SP3 is output at the timing of the electrical angle of 345 degrees. In the sample and hold circuit 13, therefore, the U-line terminal voltage at the electrical angle of 345 degrees is measured.

The judging circuit 14 checks the terminal voltage at this timing as to whether the terminal voltage exceeds a predetermined threshold or not. If the terminal voltage exceeds the threshold, the control phase at this moment is advanced from 345 degrees to 360 degrees, so that the electrical angle can follow the actual mechanical angle.

Next, with reference to FIG. 6, the judgment and processing in the judging circuit 14 in the case where the rotation phase lags will be described.

If the rotation phase lags, the terminal voltage rises slowly as shown by the solid line (in the figure, designated by the reference numeral 702). At this time, in the same way as that described with reference to FIG. 5, the judging circuit 14 checks the terminal voltage at the rotation phase of 345 degrees as to whether the terminal voltage is lower than the threshold or not. If the terminal voltage is lower than the threshold, the phase at this moment is set back from 345 degrees to 330 degrees, so that the following to the phase lag is performed.

Figure 7:
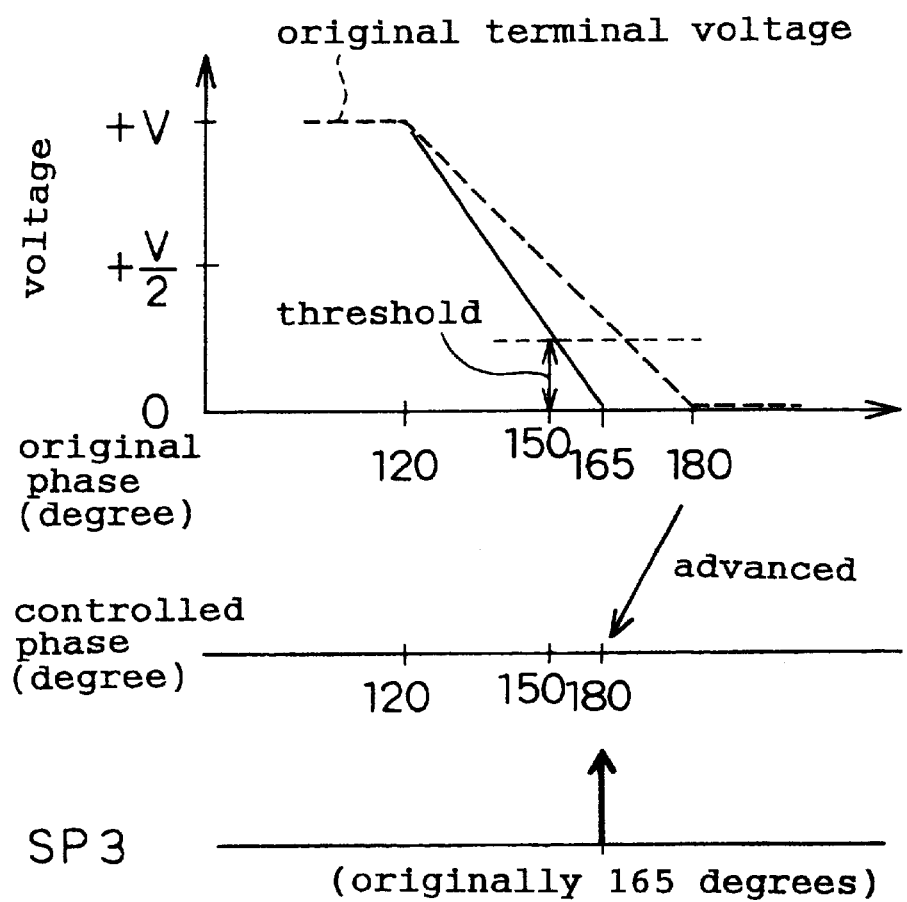
FIG. 7 is a waveform chart showing the principle of a phase advancing adjustment at rising in Embodiment 1.
Figure 8:
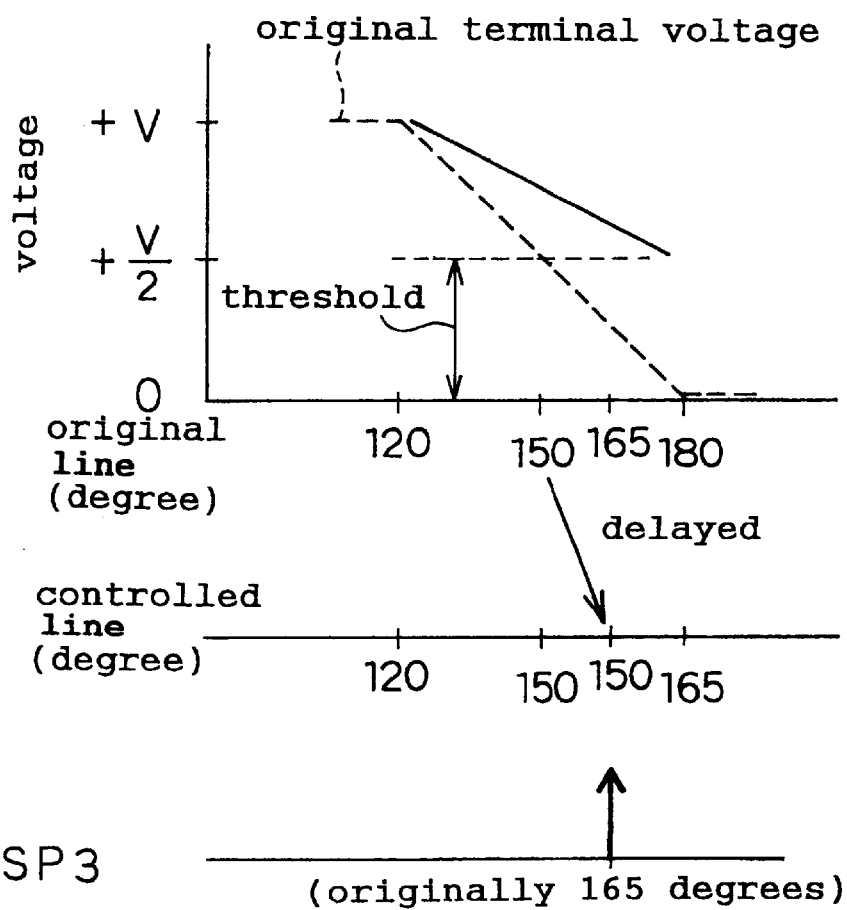
FIG. 8 is a waveform chart showing the principle of a phase delaying adjustment at falling in Embodiment 1.

In the above, the cases where the terminal voltage (the induced voltage) at rising is observed have been described. As shown in FIGS. 7 and 8, the circuit operations in the case where the sampling pulse SP3 is output at the electrical angle of 165 degrees and the U-line terminal voltage at falling is observed are the same as those described above.

Specifically, as shown in FIG. 7, when the rotation phase leads, the terminal voltage is checked as to whether the voltage is lower than a threshold or not. If the voltage is lower, the control phase at this moment is advanced from 165 degrees to 180 degrees, so that the electrical angle can follow the actual mechanical angle. Similarly, when the rotation phase lags as shown in FIG. 8, the terminal voltage is checked as to whether the voltage exceeds the threshold or not. If the terminal voltage exceeds the threshold, the control phase at this moment is set back from 165 degrees to 150 degrees, so that the electrical angle can follow the actual mechanical angle.

In the embodiment, in addition to the rotation control by the feedback loop from the sample and hold circuits 6 and 7 to the comparing circuit 10, the correction of the phase angle deviation by the judging circuit 14 is conducted, thereby realizing the rotation control with higher accuracy. Alternatively, the judging circuit 14 may not be included.

Embodiment 2

Hereinafter, Embodiment 2 of the invention (corresponding to claims 4, 5, 6, 7, and 9) will be described with reference to the drawings.

Figure 9:
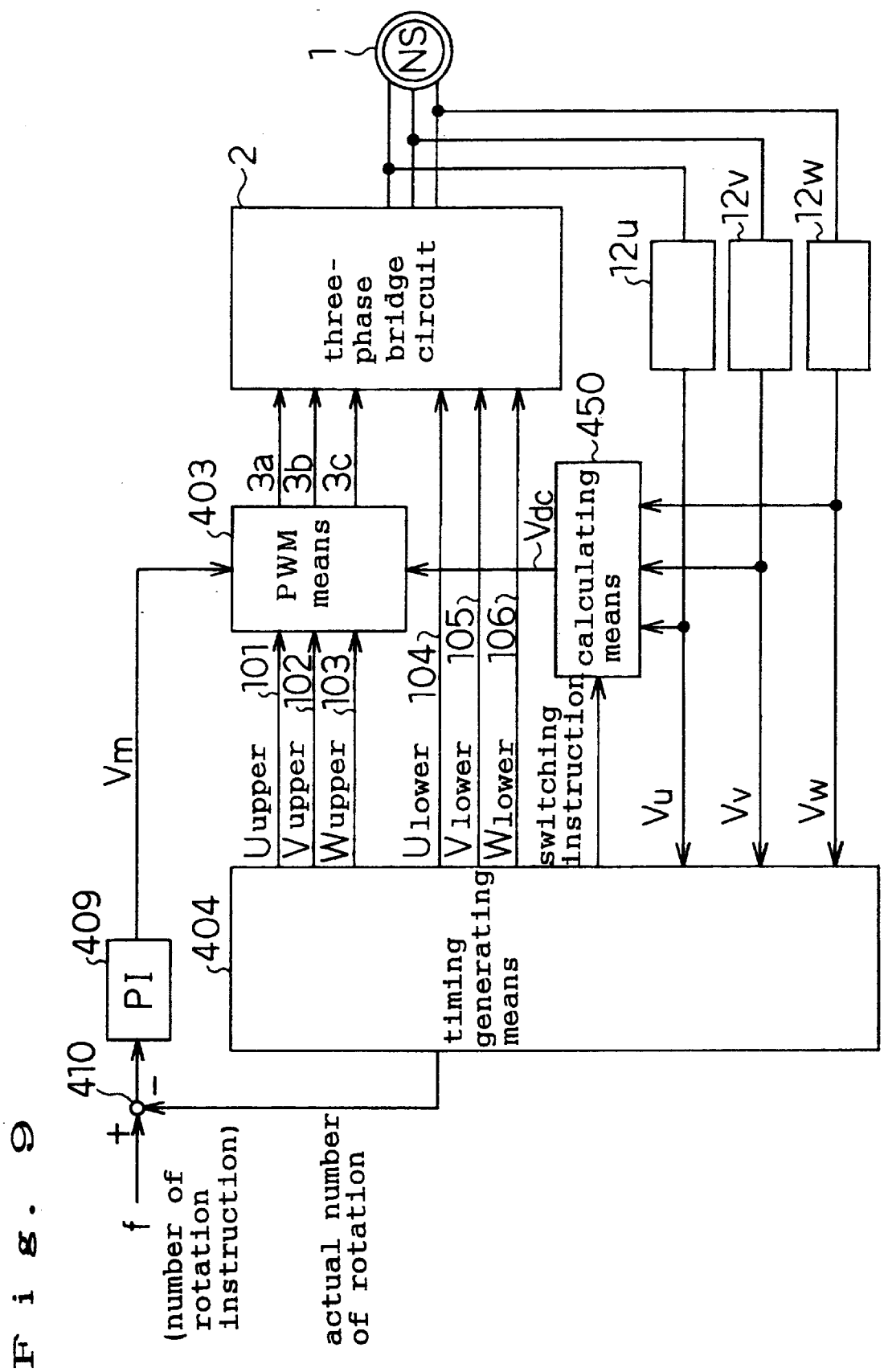
FIG. 9 is a block diagram of a brushless motor driving circuit of Embodiment 2 of the invention.
Figure 10:
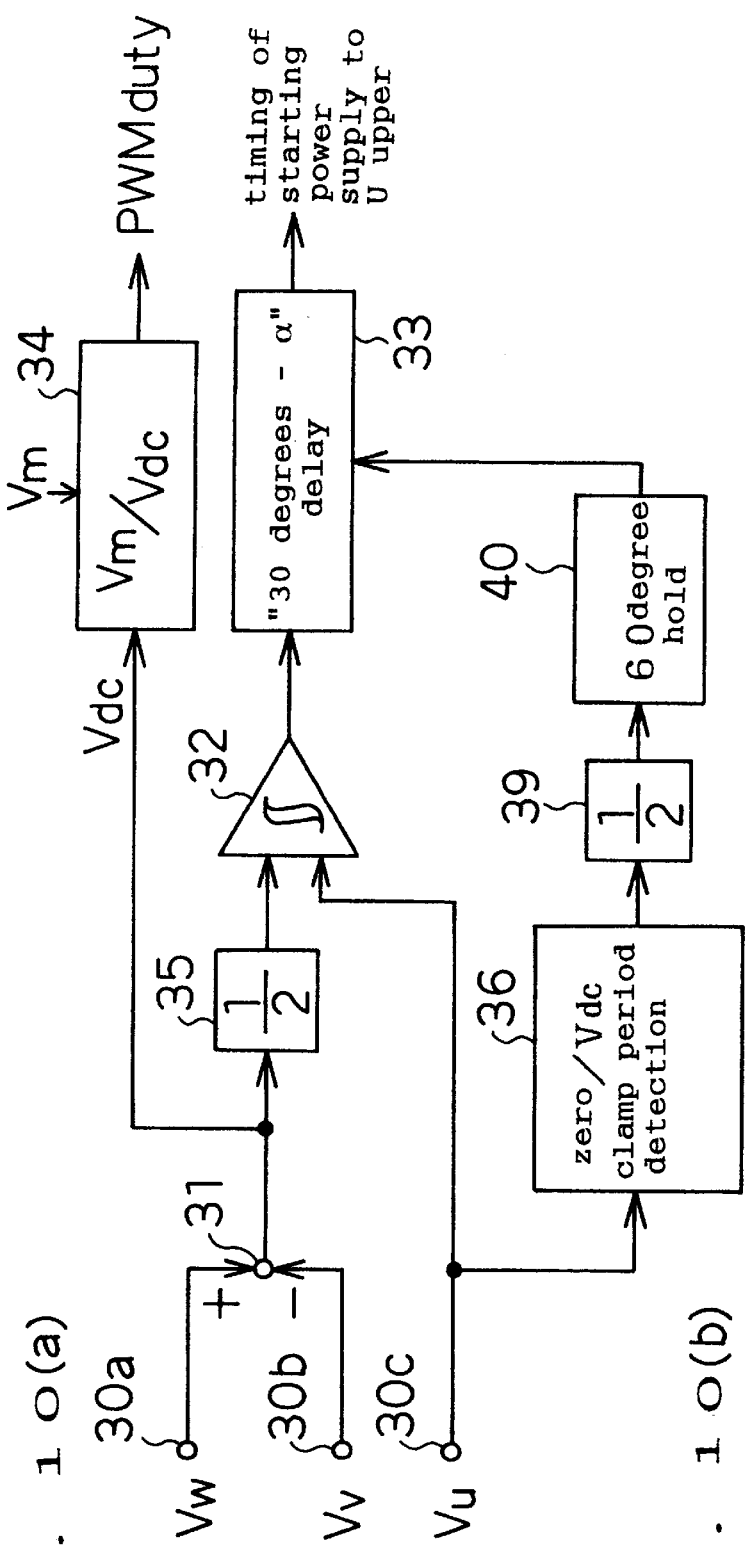
FIG. 10(a) is a block diagram of timings generating means and PWM means included in the brushless motor driving circuit of Embodiment 2.
FIG. 10(b) is a diagram illustrating a timing of switching of voltage information, a timing of changing clamp sources, and the like in Embodiment 2.
Figure 11:
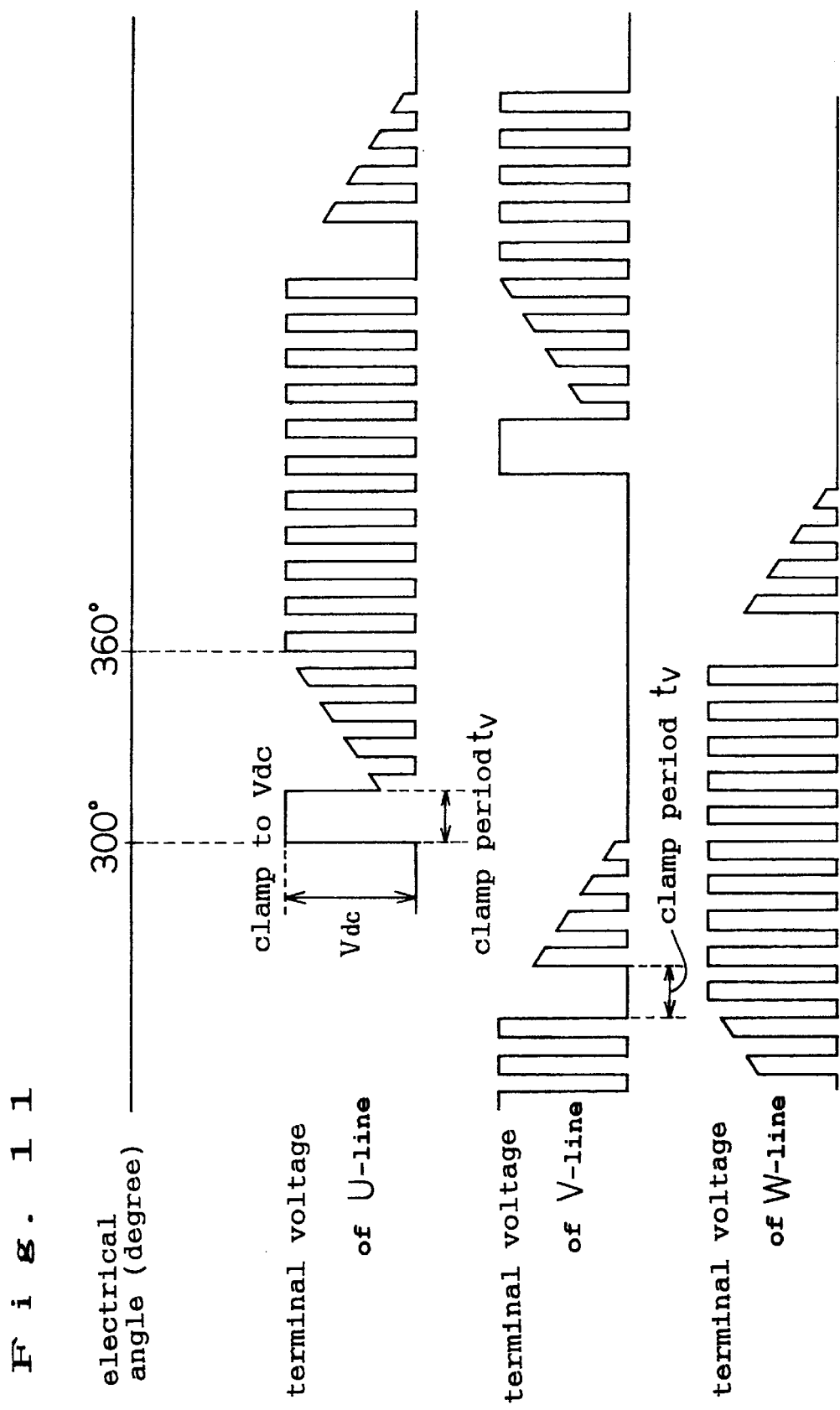
FIG. 11 is a waveform chart of terminal voltages of the brushless motor driving circuit of Embodiment 2.

FIG. 9 is a block diagram showing the whole configuration of Embodiment 2. FIG. 10(a) is a block diagram showing processing in timing generating means 404 and PWM means 403 in FIG. 9, and FIG. 10(b) is a diagram showing operation timings of the circuit of FIG. 10(a). FIG. 11 is a waveform chart showing the operation state.

In the embodiment, a calculating circuit 34 in FIG. 10(a) corresponds to the PWM means 403 in FIG. 9. FIG. 9 mainly shows the circuit configuration, and FIG. 10(a) mainly shows information processing. An output of the calculating circuit 34 corresponds to an output signal (a signal showing a timing when a W-upper signal is output) 3c of the PWM means 403 in FIG. 9. An output of delaying means 33 corresponds to an output signal (a signal showing a timing when a U-upper signal is output) 3a of the PWM means 403 in FIG. 9. In addition, Vdc which is an input to the calculating circuit 34 is calculated by calculating means 450 in FIG. 9. The calculating means 450 corresponds to calculating means 31 in FIG. 10(a). The input signal to the calculating means 450 is selected by an instruction from the timing generating means 404 based on the table of FIG. 10(b).

In FIG. 9, in the same manner as FIG. 1, the motor 1 is driven by the timing generating means 404 via the three-phase bridge circuit and partly via the PWM means 3. Terminal voltage information of the motor 1 is supplied to the timing generating means 404 via the circuits 12u, 12v, and 12w which are the same as those in FIG. 1. The timing generating means 404 generates 120-degree current-supplying PWM signals which are the same as those described above, so as to drive the motor 1. A driving control method will be described with reference to FIG. 10. The actual number of rotation which is obtained as a result of driving control is fed to comparing means 410 to be compared with a number of rotation instruction, thereby obtaining information of an error in the number of rotation. The error information is processed to be formed as voltage information Vm for driving the motor via compensation calculating means 409, and constitutes a speed control portion which is to be fed to the PWM means 403.

FIG. 10(a) is a block diagram showing the generation of various timings and the PWM duty calculating method based on motor terminal voltage information Vu, Vv, and Vw.

FIG. 10(a) shows the processing in a period of the electrical angle from 300 to 360 degrees.

The motor terminal voltage information Vw, Vv, and Vu is supplied to a first terminal portion 30a, a second terminal portion 30b, and a third terminal portion 30c shown in the figure, respectively. FIG. 10(b) is a view illustrating the switching timing of voltage information supplied to the terminal portions 30a to 30c, the timing of changing a clamp source, and the like. The switching operation of the voltage information supplied to the terminal portions 30a to 30c is performed by a switching circuit (not shown) to which output voltages of the terminal voltage waveform processing circuits 12u to 12w of FIG. 9 are supplied and which switches over the terminal portion to be supplied, based on the timing shown in FIG. 10(b). The first to third detecting means in claim 5 correspond to the third terminal portion 30c, the first terminal portion 30a, and the second terminal portion 30b, respectively.

In the period of the electrical angle of 300 to 360 degrees, the connection is realized so that a plus voltage is applied to the W line and zero voltage is applied to the V line. The U line is in a non-current-supplying condition, and it is possible to obtain induced voltage information through the terminal. The voltage information of the W and V lines is fed to a third comparing circuit 31 which calculates the difference therebetween. The voltage at this time is a DC voltage Vdc. An output of the third comparing circuit 31 is fed to calculating means 35. A half of the power-source voltage Vdc output from the third comparing circuit (that is, the neutral point of the power-source voltage) is fed to fourth comparing means 32 which compares the voltage with a terminal voltage Vu in the non-conductive period. The fourth comparing means 32 compares the non-current-supplying terminal voltage Vu with a half of the voltage Vdc. A result of the fourth comparison is fed to delaying means 33 to obtain a timing which is delayed by "30 degrees–α" from the timing when the voltage Vu exceeds ½·Vdc. The value of "α" is calculated in the following manner. A period $t_v$ in which the Vu terminal is clamped to Vdc is calculated by zero/Vdc clamp period detecting means 36, and a half of the calculated value is obtained by calculating means 39. The calculation result is held until elapse of the next 60-degree period by 60-degree holding means 40. The thus obtained timing is used as a current supply starting timing of the upper arm of the next U line, that is, a timing when the electrical angle is 360 degrees (or 0 degree). As a result, a control in which the current supply is advanced by "α" is realized.

Next, the case where a timing when the electrical angle advances to 60 degrees from 0 degree is to be calculated will be described. Referring to FIG. 10(*a*), instead of Vw, Vu is supplied to the first terminal portion 30*a*, and, instead of Vu, Vw is supplied to the third terminal portion 30*c*. To the second terminal portion 30*b*, Vv remains to be supplied. The zero/Vdc clamp period detecting means 36 calculates a period $t_v$ in which the terminal is clamped to zero. The output of the delaying means 33 is used as the current supply starting timing of the lower arm of the V-line, thereby realizing the above-described control.

In the case where a timing when the electrical angle advances to 120 degrees from 60 degrees is to be calculated, Vu, Vw, and Vv are input to the terminal portions 30*a* to 30*c*, respectively. A Vdc clamp period $t_v$ is calculated, and the current supply starting timing of the upper arm of the V line is obtained, so as to realize the above-described control. Thereafter, for the U, V, and W lines, the clamp detection conditions are cyclically changed as shown in the timing chart of FIG. 10(*b*), whereby the above-described control is realized.

On the other hand, the Vdc information is fed to the calculating circuit 34 to be subjected to calculation together with desired motor applying voltage information Vm, thereby obtaining the PWM duty. Even if the DC voltage Vdc is changed, therefore, the applying voltage to the motor is not fluctuated, so that stable driving can be performed.

Since both the output Vm of the compensation calculating means 409 and Vdc are supplied to the PWM modulating circuit 403, the calculation of the ON duty in the PWM from the value of Vm can be performed in consideration the fluctuation of the power-source voltage Vdc.

FIG. 11 is a waveform chart showing timings of the operations in FIG. 10. In the period of the electrical angle of 300 to 360 degrees, at the instant when the PWM is in the ON state, Vw is Vdc and Vv is zero. In addition, Vu is clamped to Vdc for the initial period, and thereafter the voltage rises. Accordingly, Vdc can be calculated by using Vw and Vv. The timing when Vu exceeds a half of Vdc exists at a substantially intermediate of the period described herein.

In the clamp period used for calculating a, a value of the information before the 60-degree period and calculated based on the period in which the V-line terminal voltage is clamped to be zero is used. In FIG. 11, the motor terminal voltage has an amplitude by PWM. When the voltage is passed through the peak hold circuits 12*u*, 12*v*, and 12*w* as shown in FIG. 9, it is possible to obtain a waveform substantially coincident with an envelope.

Herein, "α" is an electrical angle corresponding to a half of the period $t_v$ (see FIG. 11) in which the V-line terminal voltage Vv falls in the non-current-supplying period in the previous phase and stays for the first time at 0 V. In the current supply switching, in some cases, the timing of the selecting circuit 5 and the like may fail to perfectly coincide with that of the current supply switching. In a period immediately after the phase switching, therefore, the operation of the fourth comparing circuit 32 is stopped.

Figure 12:
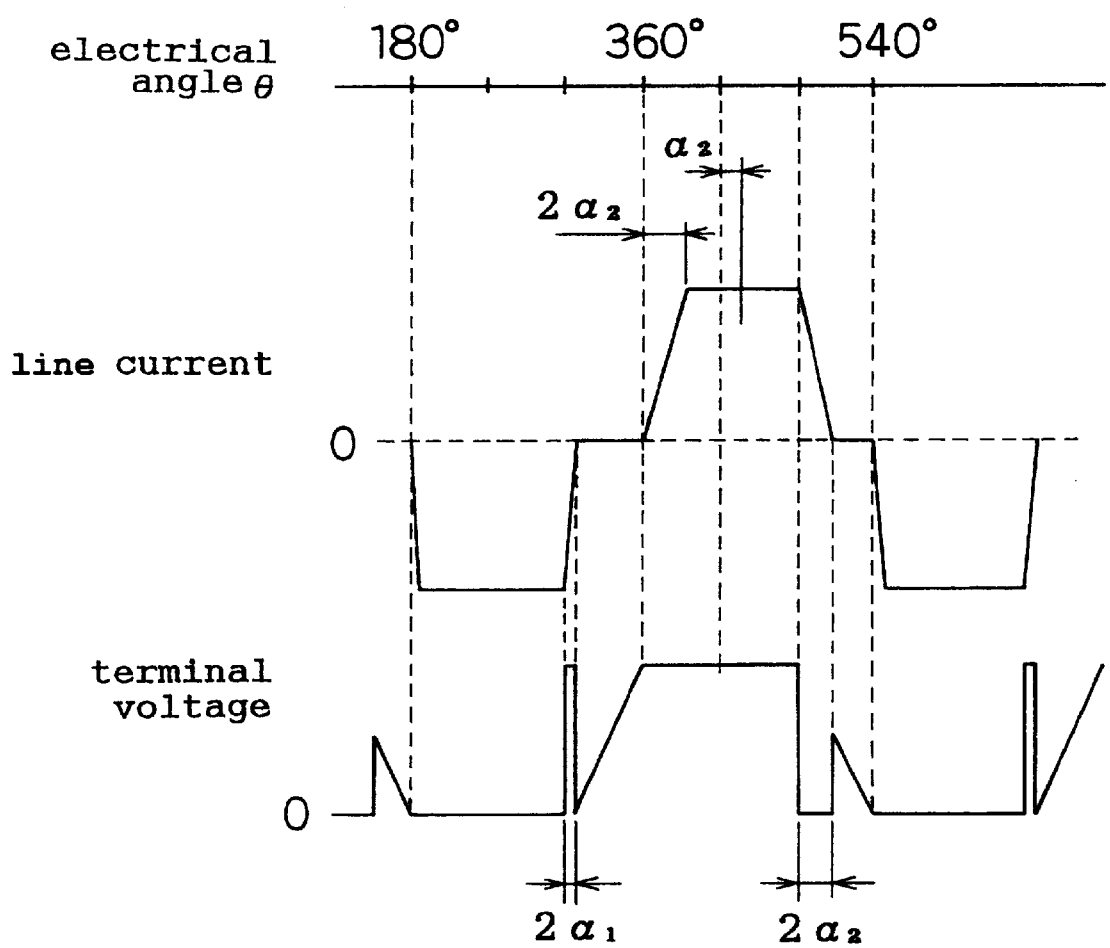
FIG. 12 is a waveform chart showing a phase relationship between a motor current and a terminal voltage in Embodiment 2.

FIG. 12 is a waveform chart related to the U line and illustrating "α." In FIG. 12, the terminal voltage has a PWM waveform, but is continuously depicted for the sake of clearity. When only the upper arm is to be subjected to PWM, the amount of the current delay caused by the inductance of the motor in the case where the phase of the upper arm is switched is different from that in the case where the phase of the lower arm is switched. When the phase of the lower arm is switched, the current accumulated in the inductance of the motor rapidly attenuates as shown at the timing of α1 in FIG. 12. Accordingly, the delay of the current phase is small. The delay time equals to a half (α1) of the period (2α1) in which the terminal voltage is clipped to the plus side. When the phase of the upper arm is switched, however, the current accumulated in the inductance of the motor slowly attenuates as shown at the timing of α2 in FIG. 12. Thus, the current phase is delayed. Accordingly, the current phase particularly at the time when the current flows into the motor largely lags with respect to the induced voltage. The delay time equals to a half of the period in which the terminal voltage is clipped to zero. Consequently, the driving is performed with being deviated from the maximum efficient point of the motor. When the phase of the upper arm is to be switched, therefore, the phase switching is made to lead by a half (α2) of the period (2α2) in which the voltage at the switching of the phase of the previous upper arm is clipped. The same operation is performed when the phase of the lower arm is to be switched.

According to this configuration, it is possible to control the rotation of the motor with higher accuracy.

In the embodiment, the PWM calculating circuit 34 and the delay circuits (33, 37, and 38) are disposed. The invention is not limited to this configuration. It is a matter of course that the configuration in which only one kind of the circuits is added to FIG. 1 may be employed.

Embodiment 3

Next, Embodiment 3 (corresponding to claim 8) of the invention will be described with reference to FIG. 13.

At the starting and in the low-speed rotation, the induced voltage of a motor is low, and hence it is difficult to accurately obtain a cross timing with a neutral point of the power-source voltage. In the control method shown in FIG. 1, the control is performed so as to balance the induced voltage, so that the control method can be used even at a low induced voltage.

The above-described embodiment is configured based on the assumption of the stabilization due to a feedback control. Therefore, the control cannot sometimes follow steep fluctuation in torque. For the rotation at a middle speed or higher, the control system shown in FIGS. 9, 10, and 11 is more stable. In the configuration in which the two control systems are simply switched over, however, an excessive current may flow depending on the control conditions. Accordingly, it is necessary to switch over the control systems, while the control conditions are detected.

Figure 13:
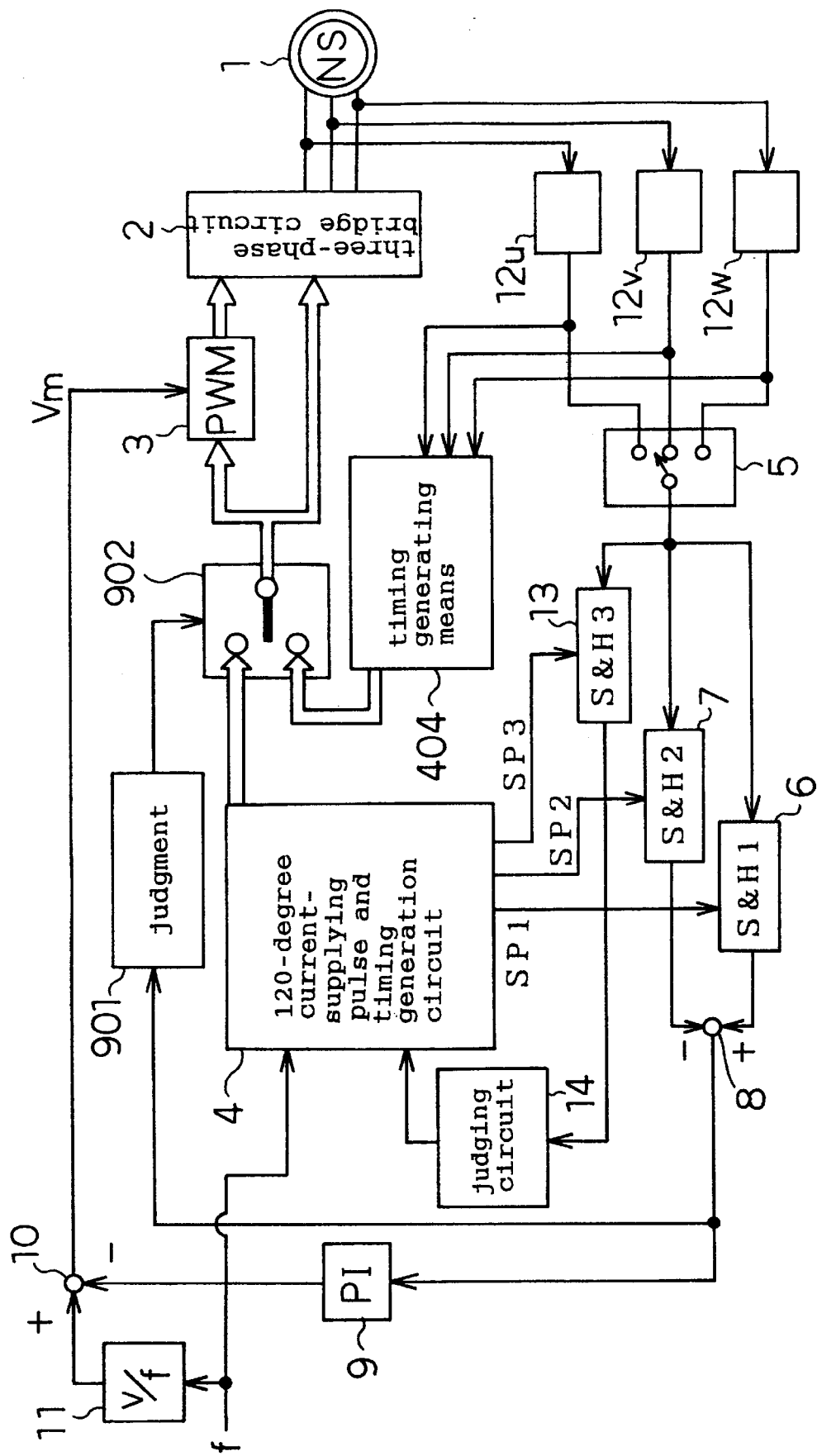
FIG. 13 is a block diagram of a brushless motor driving circuit of Embodiment 3 of the invention.

From the above-described views, in the embodiment, as shown in FIG. 13, the output of the comparing circuit 8 is supplied to judging means 901. The judging means outputs a switching instruction to switching means 902, when a condition in which the output result of the comparing circuit 8 is in a predetermined range for a predetermined period or longer is detected. The switching means 902 switches the output of the timing generating means 4 for Embodiment 1, to that of the timing generating means 404 for Embodiment 2.

According to this configuration, there is no possibility that an excessive current flows at the switching of the control system.

In the above, the embodiments the whole of which is substantially realized by circuit blocks of hardware have been described. It will be easily understood that the 120-degree current-supplying pulse and timing generation circuit 4, the selecting circuit 5, the sample and hold circuits 6, 7, and 13, the comparing circuits 8 and 10, the V/f converting circuit 11, the compensation calculating circuit 9, the PWM modulating circuit 3, and the like can be realized by software of a microcomputer.

In the above-described embodiments, as the means for adjusting the motor driving voltage, the method is used in which the upper transistors of the three-phase bridge circuit 2 are subjected to pulse width modulation, so as to obtain a desired driving voltage. It is also understood that the same effects can be attained when lower transistors are subjected to pulse width modulation. The adjustment may be realized by varying the power supply on the +V side of the DC power source to the three-phase bridge circuit 2, in place of the pulse width modulation of the transistors in the three-phase bridge circuit 2.

In Embodiments 1 and 2, the method in which induced voltages of all of the three phases of the brushless motor 1 are used has been described. In the case where there is less load fluctuation, for example, a simpler method may be employed. Namely, it is possible to employ a method in which an induced voltage of one line only is used. For example, an induced voltage of the U line only is used. In this case, in FIG. 3, the induced voltage may be sampled in the range of the electrical angle θ of −30 to 150 degrees, and the sampled voltage may be supplied to the comparing circuit 8. In this method, the selecting circuit 5 is not required, and the 90 and 210 degrees of SP1, and the 30 and 270 degrees of SP2 are decimated.

In Embodiment 1, a voltage proportional to the number of rotation is used as the reference value of the driving voltage. For a pump or the like in which the shaft torque increases in accordance with the number of rotation, the invention can be easily applied by using a voltage proportional to the square of the number of rotation as the reference value of the driving voltage.

In the above, the embodiments in which the 120-degree current supplying system is used have been described. It is apparent that the invention can be applied also to the case where the current-supplying width has a different value such as 130 degrees.

In the above-described embodiments, the output signals of the three-phase bridge circuit are modulated to have a pulse-like waveform. The invention is not limited to this. For example, for a high-speed rotation control, the PWM modulation signal may have a continuous waveform.

As apparent from the above description, according to the brushless motor driving circuit of the invention, in the case where a voltage to be supplied to a motor is generated by pulse width modulation, an induced voltage can be surely detected even when a power-source voltage is high and the width of an applied pulse is very narrow. Thus, it is possible to realize stable starting in a wide range.

According to the brushless motor driving circuit of the invention, even when a load suddenly becomes light or heavy, the rotation phase can be instantaneously modulated. Thus, it is possible to perform the driving for the load fluctuation without causing loss of synchronism.

According to the brushless motor driving circuit of the invention, the power-source voltage can be always monitored, so that the circuit can cope with fluctuation of the power-source voltage, and the like.

According to the brushless motor driving circuit of the invention, a current delay due to the inductance of the motor can be automatically compensated, and the motor can be always driven with the maximum efficiency.

According to the brushless motor driving circuit or the method of controlling the circuit of the invention, an appropriate-driving method is smoothly selected for the present speed from a very low speed to a high speed.

What is claimed is:

1. A brushless motor driving circuit comprising:
   a three-phase bridge circuit which outputs a signal which is subjected to pulse width modulation;
   a brushless motor which is connected to and driven by said three-phase bridge circuit;
   terminal voltage detecting means for detecting a terminal voltage which includes induced voltage information in a phase in which a current supply to said brushless motor is stopped; and
   controlling means for controlling the current supply to said three-phase bridge circuit based on a result of the detection by said terminal voltage detecting means,
   wherein said terminal voltage detecting means is adjusted so that a time constant at falling of the detected pulse-like voltage is larger than a time constant at rising.

2. A brushless motor driving circuit comprising: (1) a three-phase bridge circuit; (2) a brushless motor which is connected to and driven by said three-phase bridge circuit; (3) reference voltage outputting means for outputting a voltage corresponding to a preset number of rotation of said brushless motor as a motor driving voltage reference value; (4) pulse generating means for generating a pulse for sampling three-phase pulse at a same frequency; (5) terminal voltage detecting means for detecting a terminal voltage of at least one line in a non-current-supplying period of said brushless motor; and (6) a comparator which compares a value of the detected terminal voltage at rising with a value at falling, the driving voltage reference value being variable in accordance with an output of said comparator,
   wherein at a timing after an intermediate timing in the non-current-supplying period, (a) if the detected induced voltage at rising is a potential which is equal to or higher than a predetermined value, or (b) if the detected induced voltage at falling is a potential which is equal to or lower than a predetermined value, a frequency phase of said pulse generating means is adjusted to lead.

3. A brushless motor driving circuit comprising: (1) a three-phase bridge circuit; (2) a brushless motor which is connected to and driven by said three-phase bridge circuit; (3) reference voltage outputting means for outputting a voltage corresponding to a preset number of rotation of said brushless motor as a motor driving voltage reference value; (4) pulse generating means for generating a three-phase pulse at a same frequency; (5) terminal voltage detecting means for detecting a terminal voltage of at least one line in a non-current-supplying period of said brushless motor; and (6) a comparator which compares a value o f the detected terminal voltage at rising with a value at falling, the driving voltage reference value being variable in accordance with an output of said comparator, wherein at a timing after an intermediate timing in the non-current-supplying period, (a) if the detected induced voltage is a voltage of a line of an increasing voltage and the induced voltage value is a potential which is lower than a predetermined voltage between a power-source potential on a plus side a nd a power-source potential on a minus side, or (b) if the detected induced voltage is a voltage of a line of a decreasing voltage and the induced voltage value is a potential which is higher than a predetermined voltage between a power-source potential on a plus side and a power-source potential on a minus side, a frequency phase of said pulse generating means is caused to lag.

4. A brushless motor driving circuit comprising:

a three-phase bridge circuit;

a brushless motor which is connected to and driven by said three-phase bridge circuit;

first detecting means for detecting a terminal voltage of a line in which a current supply to said brushless motor is stopped;

second detecting means for detecting a terminal voltage of a line in which a current supply from a plus side of a power-source voltage is conducted by means of pulse width modulation or continuously;

third detecting means for detecting a terminal voltage of a line in which a current supply from a minus side of the power-source voltage is conducted by means of pulse width modulation or continuously; and controlling means for controlling a current supply to said three-phase bridge circuit by performing pulse width modulation on the plus side or on the minus side of the power-source voltage, wherein a result of the detection by said second detecting means and a result of the detection by said third detecting means is used in a calculation of an amount of modulation of the pulse width modulation as power-source voltage information.

5. A brushless motor driving circuit comprising:

a three-phase bridge circuit;

a brushless motor which is connected to and driven by said three-phase bridge circuit;

first detecting means for detecting a terminal voltage of a line in which a current supply to said brushless motor is stopped;

second detecting means for detecting a terminal voltage of a line in which a current supply from a plus side of a power-source voltage is conducted by means of pulse width modulation or continuously;

third detecting means for detecting a terminal voltage of a line in which a current supply from a minus side of the power-source voltage is conducted by means of pulse width modulation or continuously; and controlling means for controlling a current supply to said three-phase bridge circuit by performing pulse width modulation on the plus side or on the minus side of said power-source voltage, wherein said controlling means compares a half of a difference between a result of the detection by said second detecting means and a result of the detection by said third detecting means with a detection value of said first detecting means, and switches over a current-supplying phase at a timing delayed by a predetermined angle from a timing when a result of the comparison is inverted.

6. A brushless motor driving circuit according to claim 5, wherein said controlling means does not use a result of the comparison which is obtained immediately after the current-supplying phase is switched over.

7. A brushless motor driving circuit comprising: a three-phase bridge circuit;

a brushless motor which is connected to and driven by said three-phase bridge circuit;

detecting means for detecting a terminal voltage of a line in which a current supply to said brushless motor is stopped; and controlling means for controlling the current supply to said three-phase bridge circuit based on a result of the detection by said terminal voltage detecting means, wherein said controlling means compares the result of the detection by said detecting means with a neutral point potential of a power-source voltage, and (a) if the result of the detection by said detecting means is in an increasing direction, said controlling means detects a first timing period in which the result of the detection by said detecting means becomes lower than the neutral point potential for a first time after phase switching, and a second timing when said detection result subsequently becomes higher than the neutral point potential, (b) if the result of the detection by said detecting means is in a decreasing direction, said controlling means detects a third timing period in which the result of the detection by said detecting means becomes higher than the neutral point potential for a first time after phase switching, and a fourth timing when said detection result subsequently becomes lower than the neutral point potential, (c) if the result of the detection by said detecting means is in an increasing direction, said controlling means detects the second timing, and then performs phase switching at a timing delayed by a value obtained by subtracting a half of said third timing period from a predetermined current-supplying angle, and (d) if the result of the detection by said detecting means is in a decreasing direction, said controlling means detects the fourth timing, and then performs phase switching at a timing delayed by a value obtained by subtracting a half of said first timing period from a predetermined current-supplying angle.

8. A method of controlling a brushless motor driving circuit, said brushless motor driving circuit including:

a three-phase bridge circuit;

a brushless motor which is connected to and driven by said three-phase bridge circuit;

a reference voltage outputting means for outputting a voltage corresponding to a preset number of rotations of said brushless motor as a motor driving voltage reference value;

pulse generating means for generating a pulse for sampling three-phase pulse at a same frequency;

terminal voltage detecting means for detecting a terminal voltage of at least one line in a non-current-supplying period of said brushless motor; and a comparator which compares a value of the detected terminal voltage at rising with a value at falling, the driving voltage reference value being variable in accordance with an output of said comparator, wherein, at a timing after an intermediate timing in the current-supplying period, said method comprising the steps of:

controlling the frequency phase of said pulse generating means to lead if the detected induced voltage is a potential which is equal to or higher than a predetermined value at rising, or a potential which is equal to or lower than a predetermined value at falling; and controlling the frequency phase of said pulse generating means to lag if the detected induced voltage is a potential which is equal to or lower than a predetermined value at rising, or a potential which is equal to or lower than a predetermined value at falling.

9. A method of controlling a brushless motor driving circuits said brushless motor driving circuit including:

a three-phase bridge circuit;

a brushless motor which is connected to and driven by said three-phase bridge circuit;

first detecting means for detecting a terminal voltage of a line in which a current supply to said brushless motor is stopped;

second detecting means for detecting a terminal voltage in a current-supplying condition of a line in which a current supply from a plus side of power-source voltage is conducted by means of pulse width modulation or continuously;

third detecting means for detecting a terminal voltage in a current-supplying condition of a line in which a current supply from a minus side of power-source voltage is conducted by means of pulse width modulation or continuously; and controlling means for controlling a current supply to said three-phase bridge circuit by performing pulse width modulation on the plus side or on the minus side of said power-source voltage, said method comprising the steps of:

comparing a half of a difference between a result of the detection by said second detecting means and a result of the detection by said third detecting means with a detection value of said first detecting means, and switching over a current supplying phase at a timing delayed by a predetermined angle from a timing when a result of the comparison is inverted.

wherein said comparing and switching steps are performed by said controlling means.

10. A method of controlling a brushless motor driving circuit that includes, a three-phase bridge circuit;

a brushless motor which is connected to and driven by said three-phase bridge circuit;

a reference voltage outputting means for outputting a voltage corresponding to a preset number of rotations of said brushless motor as a motor driving voltage reference value;

pulse generating means for generating a pulse for sampling three-phase pulse at a same frequency;

terminal voltage detecting means for detecting a terminal voltage of at least one line in a non-current-supplying period of said brushless motor; and a comparator which compares a value of the detected terminal voltage at rising with a value at falling, the driving voltage reference value being variable in accordance with an output of said comparator, wherein at the starting of said brushless motor, said method comprising:

controlling said brushless motor driving circuit by controlling the frequency phase of said pulse generating means to lead if the detected induced voltage is a potential which is equal to or higher than a predetermined value at rising, or a potential which is equal to or lower than a predetermined value at falling; and controlling the frequency phase of said pulse generating means to lag if the detected induced voltage is a potential which is equal to or lower than a predetermined value at rising, or a potential which is equal to or lower than a predetermined value at falling, and wherein said brushless motor driving circuit further includes first detecting means for detecting a terminal voltage of a line in which a current supply to said brushless motor is stopped:

second detecting means for detecting a terminal voltage in a current-supplying condition of a line in which a current supply from a plus side of power-source voltage is conducted by means of pulse width modulation or continuously;

third detecting means for detecting a terminal voltage in a current-supplying condition of a line in which a current supply from a minus side of power-source voltage is conducted by means of pulse width modulation or continuously; and controlling means for controlling a current supply to said three-phase bridge circuit by performing pulse width modulation on the plus side or on the minus side of said power-source voltage and, when it is detected that a difference between an induced voltage at rising and an induced voltage at falling is continuously in a predetermined range for a predetermined period, said method of controlling is switched to comparing a half of a difference between a result of the detection by said second detecting means and a result of the detection by said third detecting means with a detection value of said first detecting means, and switching over a current supplying phase at a timing delayed by a predetermined angle from a timing when a result of the comparison is inverted, wherein said comparing and switching steps are performed by said controlling means.

* * * * *